United States Patent
Hsiang et al.

(10) Patent No.: US 12,181,932 B2
(45) Date of Patent: Dec. 31, 2024

(54) MULTIPLE-AXIS HINGE MECHANISM AND FOLDABLE DEVICE HAVING SAME

(71) Applicant: Google LLC, Mountain View, CA (US)

(72) Inventors: Shih-Wei Hsiang, Taipei (TW); Hung-Wei Wang, Taipei (TW); Ching-Chih Yen, Mountain View, CA (US); Po-Kai Lai, Mountain View, CA (US); Jeng-wen Lin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 325 days.

(21) Appl. No.: 17/756,164

(22) PCT Filed: Dec. 24, 2020

(86) PCT No.: PCT/US2020/070954
§ 371 (c)(1),
(2) Date: May 18, 2022

(87) PCT Pub. No.: WO2021/150361
PCT Pub. Date: Jul. 29, 2021

(65) Prior Publication Data
US 2022/0397943 A1 Dec. 15, 2022

Related U.S. Application Data

(60) Provisional application No. 62/963,790, filed on Jan. 21, 2020.

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC ...... G06F 1/1681; G06F 1/1652; E05D 3/122
(Continued)

(56) References Cited

U.S. PATENT DOCUMENTS

| 8,720,011 B1* | 5/2014 | Hsu | G06F 1/1681 |
| | | | 16/354 |
| 8,971,031 B2* | 3/2015 | Mok | G06F 1/1652 |
| | | | 361/679.27 |

(Continued)

FOREIGN PATENT DOCUMENTS

| CN | 105812509 A | 7/2016 |
| EP | 3355159 A1 | 8/2018 |

(Continued)

OTHER PUBLICATIONS

Communication pursuant to Rules 161(1) and 162 EPC from counterpart European Application No. 20845549.3 dated Jun. 22, 2022, 3 pp.

(Continued)

*Primary Examiner* — Jeffrey O'Brien
(74) *Attorney, Agent, or Firm* — Shumaker & Sieffert, P.A.

(57) ABSTRACT

A foldable device may include a foldable layer and a hinge mechanism. The hinge mechanism may include at least one gear module that provides for synchronized movement of the hinge mechanism about a central plane of the hinge mechanism. A lock module may be coupled the hinge mechanism. The lock module may include a cam and a plate including a plurality of recesses. The lock module may selectively lock the hinge mechanism, and the foldable device, in one of a plurality of positions, based on a position of the cam in one of the recesses.

12 Claims, 29 Drawing Sheets

(58) Field of Classification Search
USPC .......................................................... 16/354
See application file for complete search history.

(56) References Cited

U.S. PATENT DOCUMENTS

| | | | | |
|---|---|---|---|---|
| 9,684,343 | B2* | 6/2017 | Tazbaz | G06F 1/1618 |
| 9,848,502 | B1* | 12/2017 | Chu | G06F 1/1681 |
| 10,241,548 | B2* | 3/2019 | Tazbaz | G06F 1/1641 |
| 10,488,887 | B2* | 11/2019 | Yamazaki | H04M 1/0216 |
| 10,495,941 | B2* | 12/2019 | Hashimoto | G02F 1/16753 |
| 10,551,880 | B1* | 2/2020 | Ai | G06F 1/1641 |
| 10,837,209 | B2* | 11/2020 | Lin | G06F 1/1681 |
| 10,845,850 | B1* | 11/2020 | Kang | E05D 3/122 |
| 11,048,296 | B2* | 6/2021 | Hsu | G06F 1/1652 |
| 11,223,710 | B2* | 1/2022 | Cheng | H04M 1/0268 |
| 11,237,596 | B2* | 2/2022 | Kim | G06F 1/1618 |
| 11,243,578 | B2* | 2/2022 | Torres | G06F 1/1616 |
| 11,528,352 | B1* | 12/2022 | Lim | H04M 1/0237 |
| 11,550,367 | B2* | 1/2023 | Lin | G06F 1/1681 |
| 11,726,530 | B2* | 8/2023 | Kang | G06F 1/1681 |
| | | | | 361/679.27 |
| 11,809,228 | B2* | 11/2023 | Hsu | G06F 1/1618 |
| 11,809,239 | B2* | 11/2023 | Hwang | F16C 11/04 |
| 11,825,620 | B2* | 11/2023 | Zhao | H05K 5/0226 |
| 11,924,987 | B2* | 3/2024 | Lee | G06F 1/16 |
| 11,927,991 | B2* | 3/2024 | Torres | E05D 3/16 |
| 11,977,421 | B2* | 5/2024 | Yang | G06F 1/1681 |
| 2014/0174226 | A1* | 6/2014 | Hsu | G06F 1/1681 |
| | | | | 74/98 |
| 2016/0014914 | A1* | 1/2016 | Stroetmann | G06F 1/1681 |
| | | | | 312/223.1 |
| 2016/0147267 | A1* | 5/2016 | Campbell | H04M 1/0216 |
| | | | | 16/369 |
| 2018/0136696 | A1* | 5/2018 | Chen | H04M 1/0216 |
| 2020/0382627 | A1* | 12/2020 | Park | H04M 1/0216 |
| 2021/0191475 | A1* | 6/2021 | Park | G06F 1/1652 |
| 2021/0355988 | A1* | 11/2021 | Cheng | G06F 1/1681 |
| 2022/0070285 | A1* | 3/2022 | Ge | G06F 1/1652 |
| 2022/0155828 | A1* | 5/2022 | Hsiang | H04M 1/0268 |
| 2022/0174830 | A1* | 6/2022 | Li | H04M 1/022 |
| 2022/0303371 | A1* | 9/2022 | Liao | H04M 1/0216 |
| 2023/0103700 | A1* | 4/2023 | Park | G06F 1/1652 |
| | | | | 361/679.01 |
| 2023/0213983 | A1* | 7/2023 | Yun | H04M 1/022 |
| | | | | 361/679.27 |
| 2023/0216941 | A1* | 7/2023 | Park | H04M 1/022 |
| | | | | 455/575.3 |
| 2023/0221773 | A1* | 7/2023 | Zhang | F16C 11/12 |
| | | | | 361/679.27 |
| 2023/0229189 | A1* | 7/2023 | Li | G06F 1/1616 |
| 2023/0236635 | A1* | 7/2023 | Liu | F16C 11/10 |
| | | | | 361/679.21 |
| 2023/0297133 | A1* | 9/2023 | Lee | G06F 1/1683 |
| | | | | 361/679.02 |
| 2023/0366248 | A1* | 11/2023 | Chung | G06F 1/1681 |
| 2023/0384822 | A1* | 11/2023 | Lee | G06F 1/1681 |
| 2023/0421673 | A1* | 12/2023 | Huang | G06F 1/1652 |

FOREIGN PATENT DOCUMENTS

| | | |
|---|---|---|
| JP | 2016169813 A | 9/2016 |
| KR | 20180094172 A | 8/2018 |

OTHER PUBLICATIONS

International Preliminary Report on Patentability from International Application No. PCT/US2020/070954 dated Jul. 26, 2022, 7 pp.
First Office Action and Search Report, and translation thereof, from counterpart Chinese Application No. 202080086571.5 dated Sep. 12, 2023, 14 pp.
International Search Report and Written Opinion for PCT Application No. PCT/US2020/070954, mailed on Apr. 19, 2021, 11 pages.
Notice of Intent to Grant from counterpart Chinese Application No. 202080086571.5 dated Mar. 27, 2024, 3 pp.
Response to Communication Pursuant to Rules 161(1) and 162 EPC dated Jun. 22, 2022, from counterpart European Application No. 20845549.3, filed Dec. 8, 2022, 14 pp.

* cited by examiner

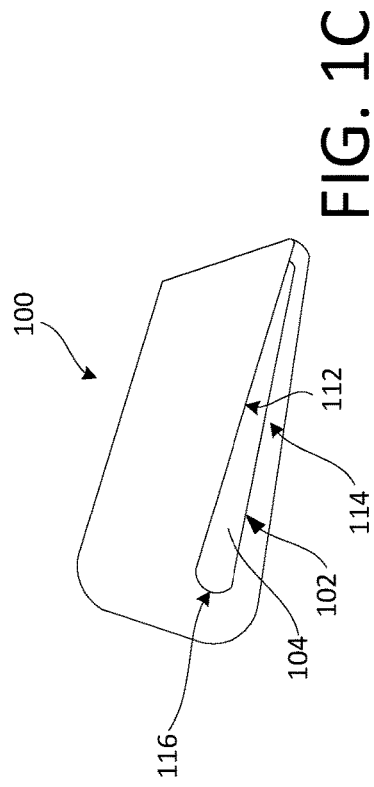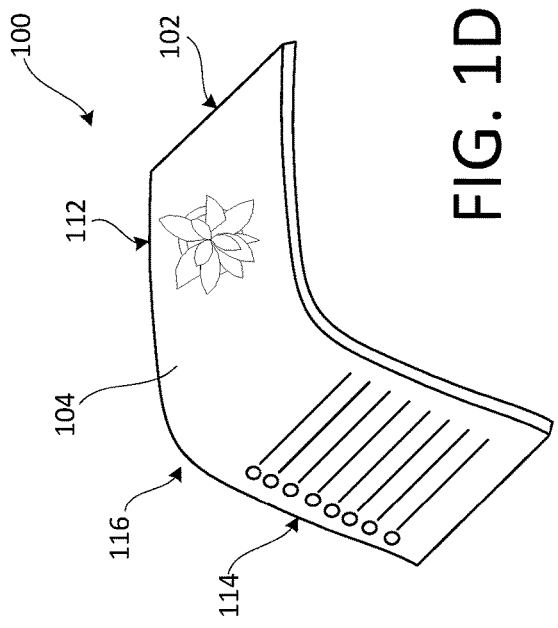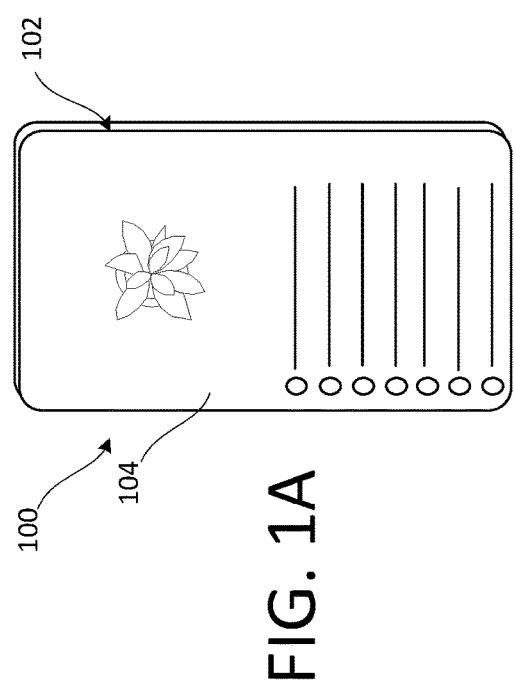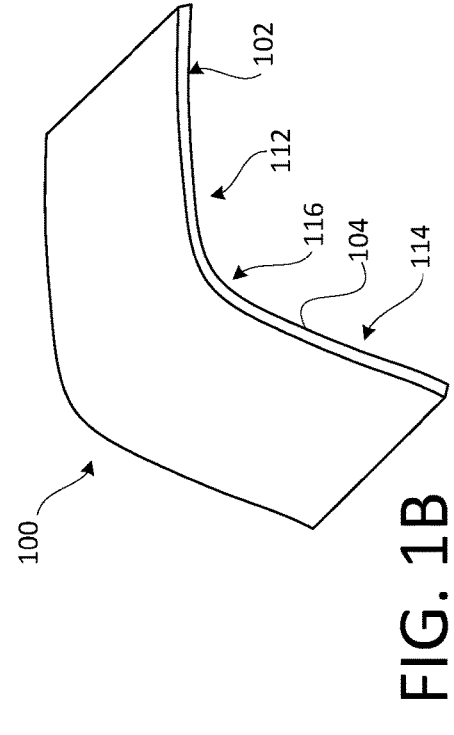

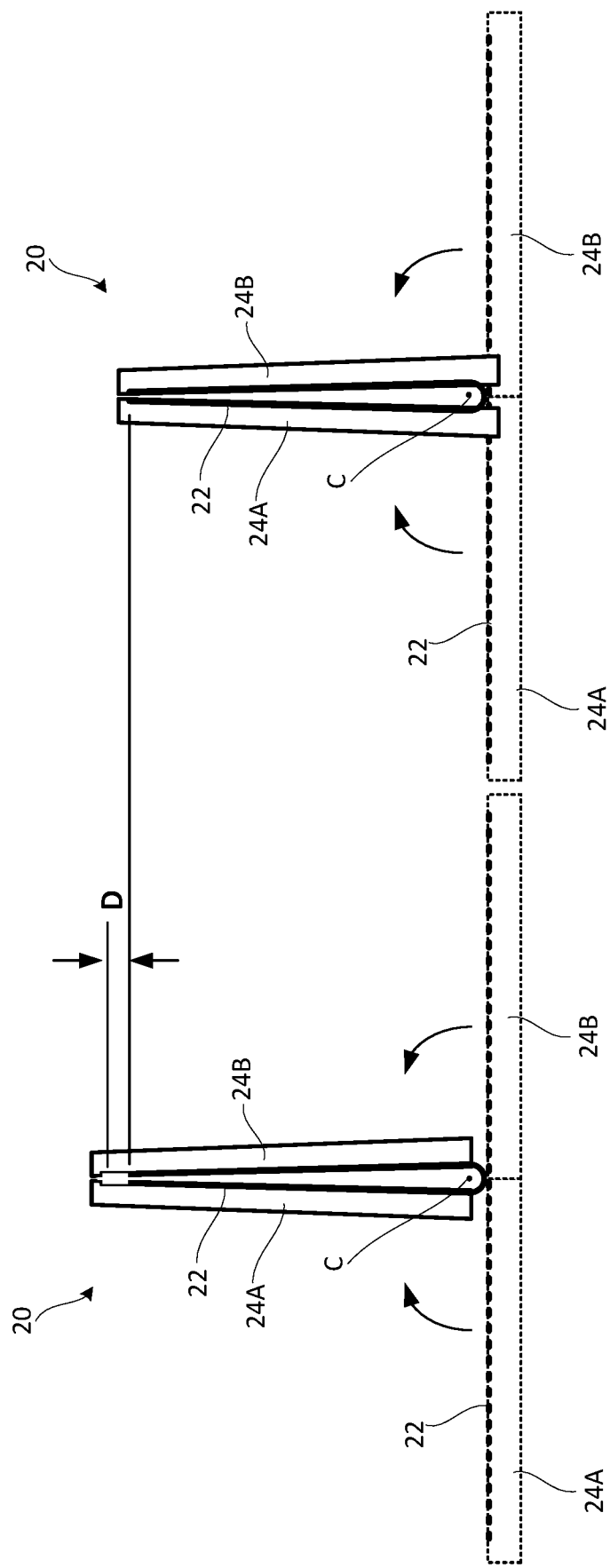

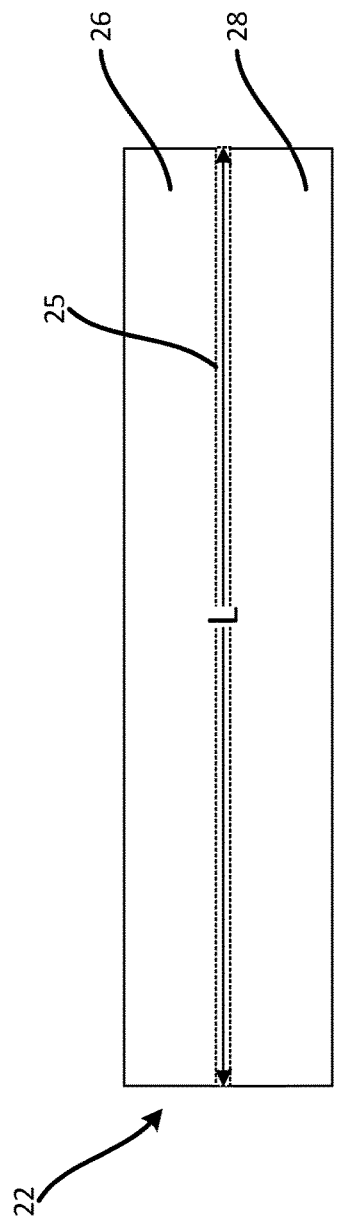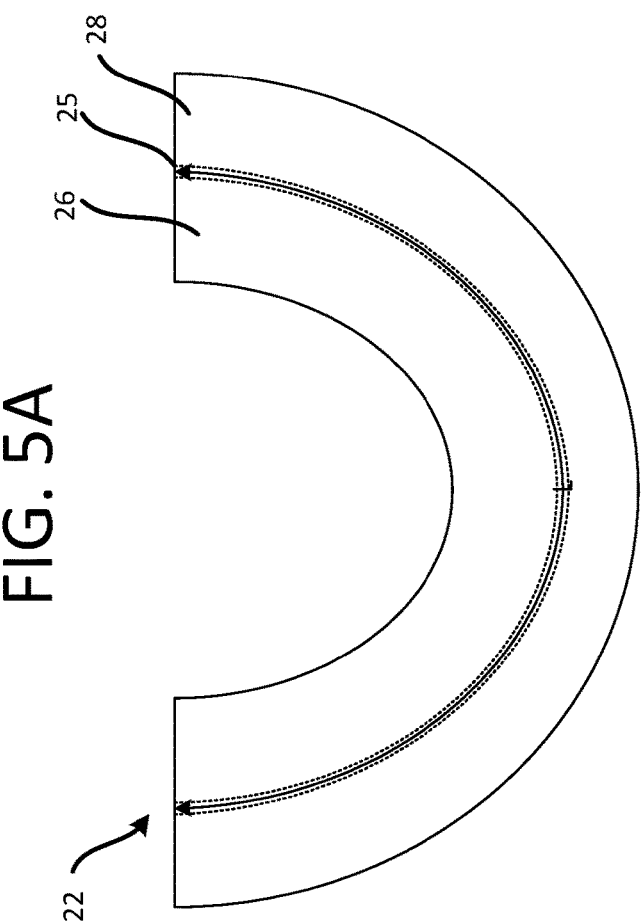
FIG. 5A
FIG. 5B

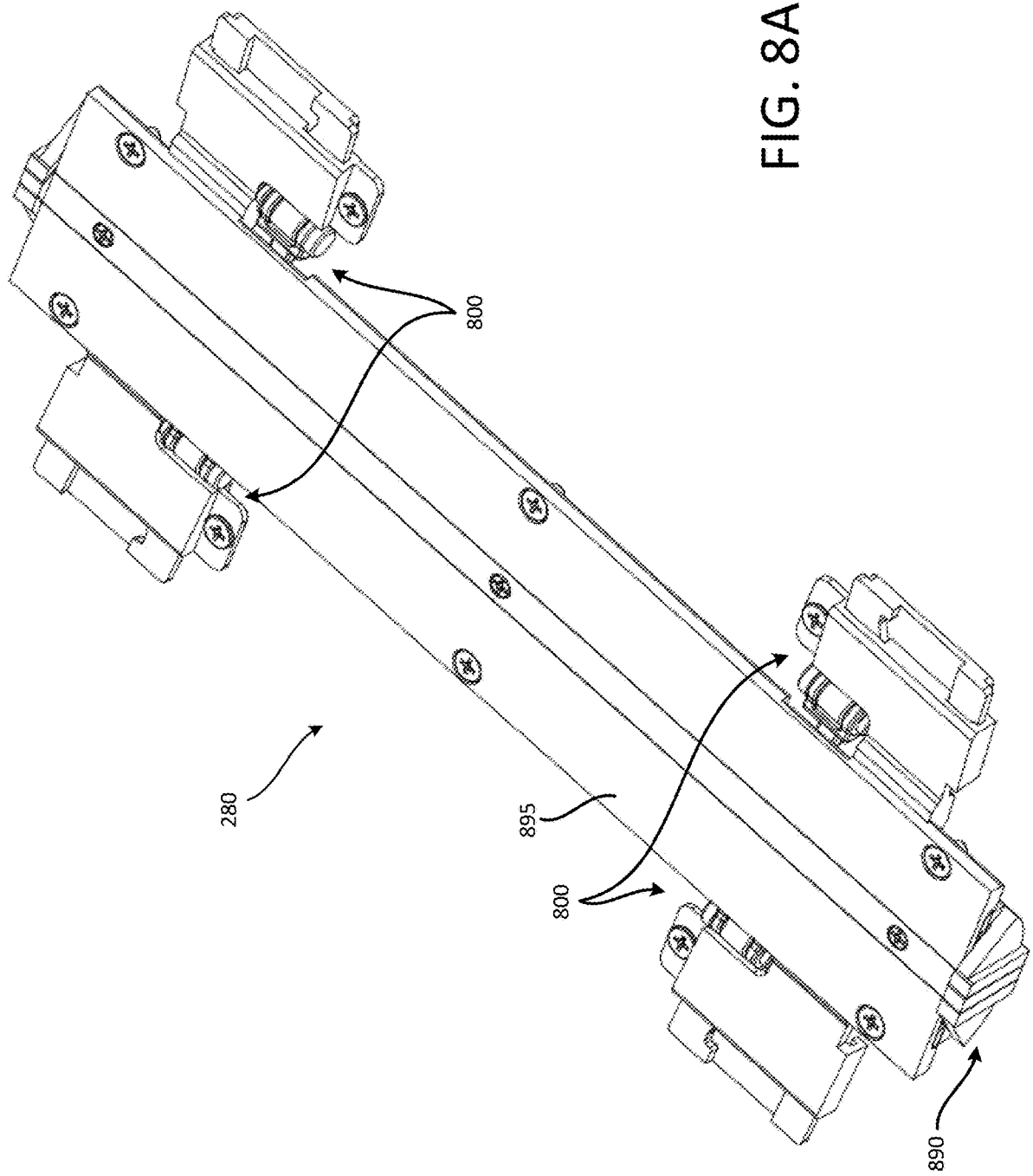

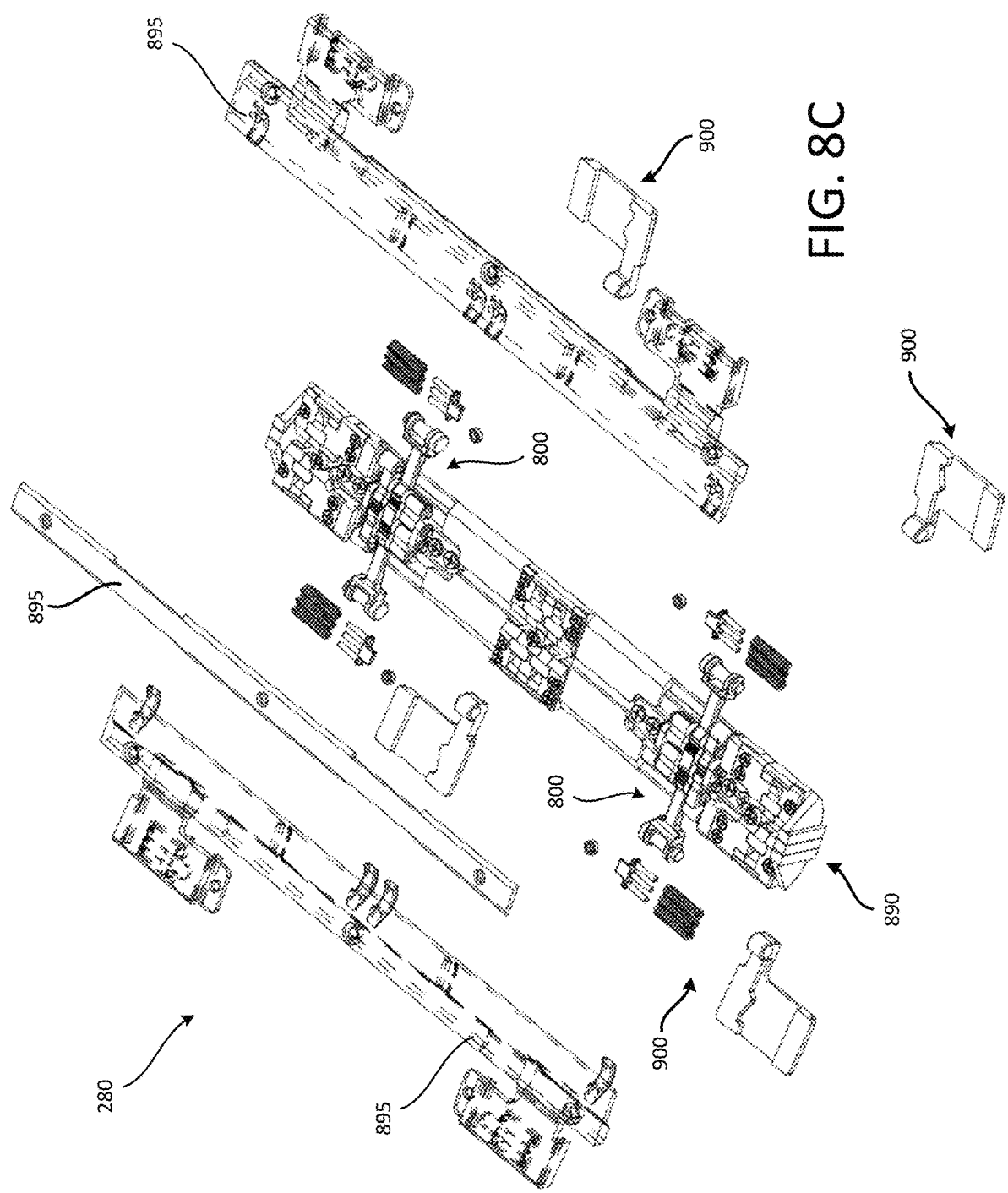

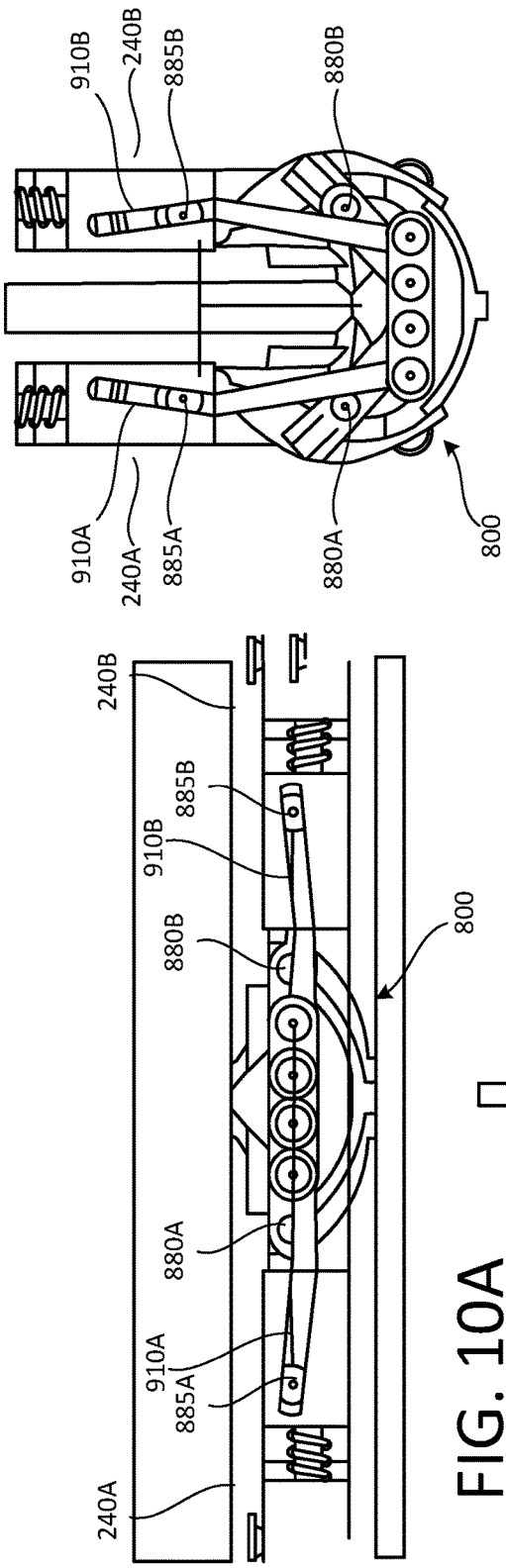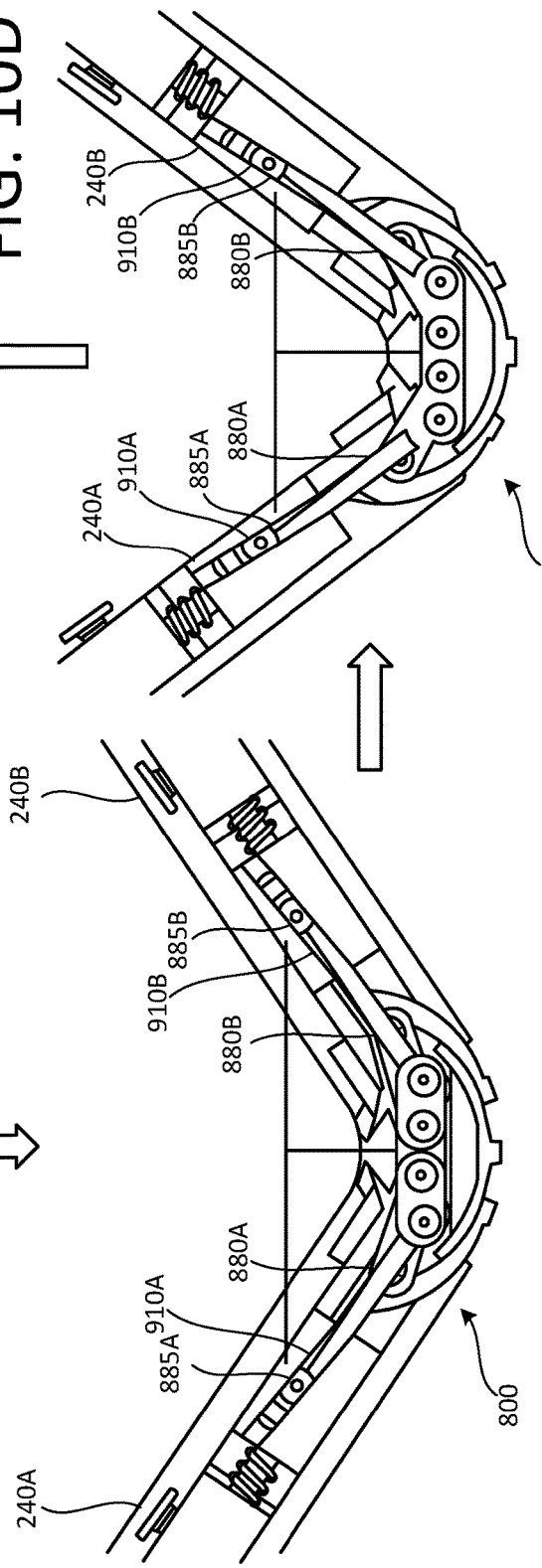

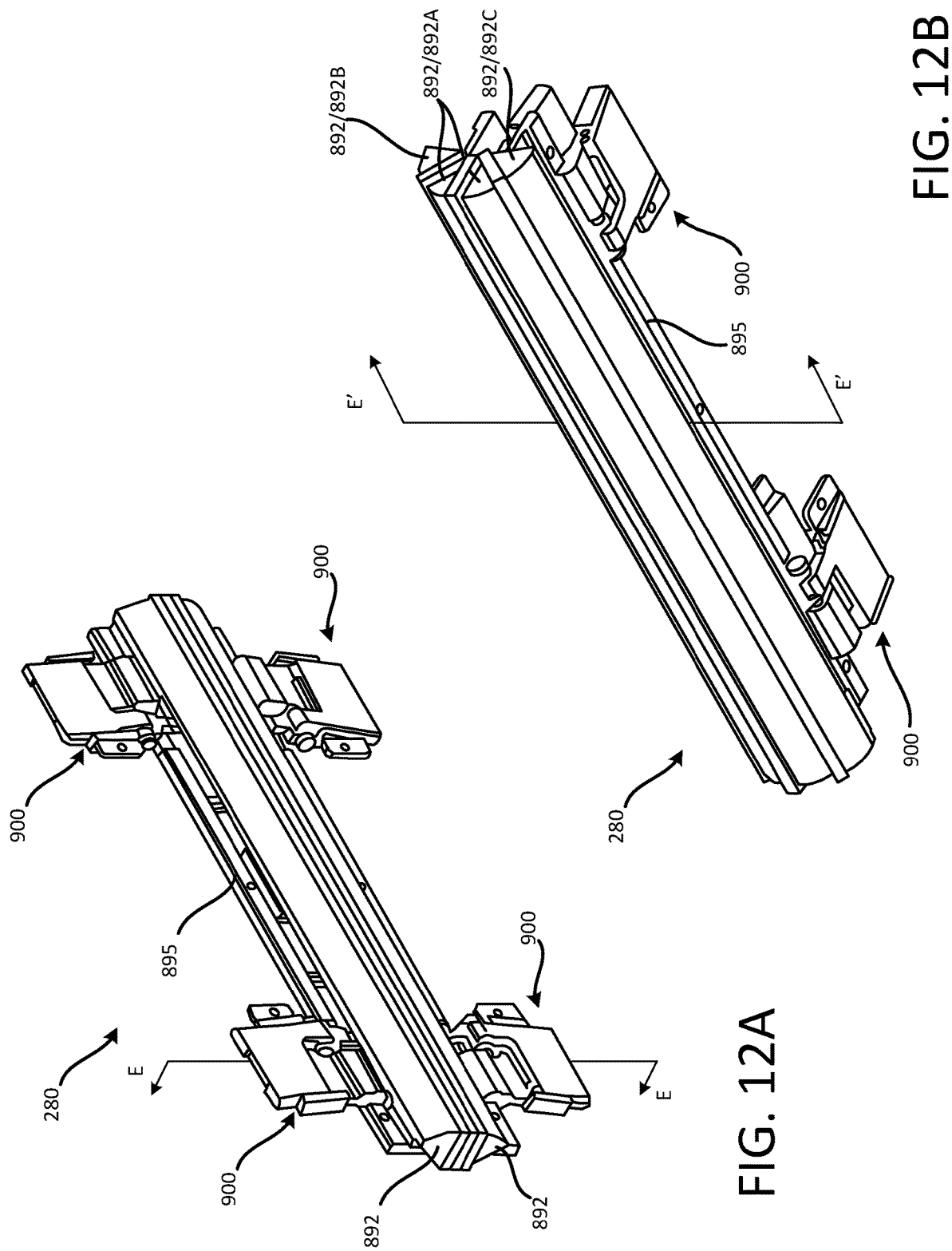

MULTIPLE-AXIS HINGE MECHANISM AND FOLDABLE DEVICE HAVING SAME

CROSS-REFERENCE TO RELATED APPLICATIONS

This application is a 35 U.S.C. § 371 National Phase Entry Application from PCT/US2020/070954, filed on Dec. 24, 2020, entitled "MULTIPLE-AXIS HINGE MECHANISM AND FOLDABLE DEVICE HAVING SAME", which claims the benefit of U.S. Provisional Application No. 62/963,790, filed on Jan. 21, 2020, the disclosures of which are incorporated herein by reference in their entirety.

TECHNICAL FIELD

This description relates, in general, to hinge mechanisms for foldable devices, and, in particular, to hinge mechanisms supporting foldable display systems.

BACKGROUND

Modern computing devices often attempt to achieve a balance between portability and functionality. The desire for a device that provides for a rich display of information on a single surface (suggesting a device having a relatively large form factor) may conflict with the desire to have a device that is small enough to be easily carried and easily accessible (suggesting a device having a relatively small form factor). A flexible, or foldable, display device may enhance the capabilities of a computing device, in that, in a folded configuration, the device may have a relatively small form factor, and in an unfolded configuration, the device may take advantage of a relatively large display area. In some situations, mechanisms guiding and supporting the folding and unfolding of such a device may be relatively complex, and susceptible to failure. These complex mechanisms may produce a somewhat artificial folding motion, and may introduce stress on the foldable device, thus damaging components of the display portion of the foldable device. Flexible support in a bending area of the display portion of the foldable device may provide a more natural folding motion, may maintain a desired contour, or curvature, of the display portion in the folded and unfolded configurations, and, and may prevent damage due to excessive compression and/or tension exerted on components of the display portion of the foldable device.

SUMMARY

In a general aspect, a hinge mechanism may include a gear module, at least one lock module, and an outer cover module. In some implementations, the gear module may include a first link configured to be coupled to a first body, a second link configured to be coupled to a second body, a central synchronizing gear in meshed engagement between the first link and the second link, a first synchronizing member coupled to the first link, and a second synchronizing member coupled to the second link, wherein the second synchronizing member is in meshed engagement with the first synchronizing member. The at least one lock module may be coupled to the gear module. The outer cover module may be coupled to an exterior facing side of the gear module and the at least one lock module.

Implementations can include one or more of the following features, in isolation, or in any combination with each other. For example, in some implementations, the first link and the second link, and the first synchronizing member and the second synchronizing member, are configured to rotate symmetrically about a central axis of the gear module in response to an external force applied to the hinge mechanism. In some implementations, the central synchronizing gear includes a first gear in meshed engagement with the first link, and a second gear in meshed engagement with the second link. The central synchronizing gear may include a body, the first gear being at a first end portion of the body, and the second the gear being at a second end portion of the body. In some implementations, the hinge mechanism includes at least one bracket coupling the gear module to a hinge base.

In some implementations, the first link and the second link may each include a body, a gear at a first end portion of the body, in meshed engagement with the central synchronizing gear, and a coupling portion at a second end portion of the body, including at least one slot configured to slidably receive a slide pin. In some implementations, the slide pin is configured to couple the lock module to the gear module. The lock module may include a plate, a first recess and a second recess defined in the plate, a cam configured to move along the plate, between the first recess and the second recess, in response to an external force applied to the hinge mechanism, and a biasing member that biases the cam toward the first recess or the second recess. In some implementations, in an unfolded configuration of the hinge mechanism, the cam may be biased into and held in the first recess so as to maintain the hinge mechanism in the unfolded configuration. In a folded configuration of the hinge mechanism, the cam may be biased into and held in the second recess so as to maintain the hinge mechanism in the folded configuration.

In some implementations, the outer cover module comprises a plurality of segments, each of the plurality of segments including: a wall portion; and a stopper portion protruding from the wall portion, wherein, in the unfolded configuration of the hinge mechanism, the stopper abuts the stopper of an adjacent segment of the plurality of segments, so as to restrict further unfolding motion of the hinge mechanism, and in the folded configuration, a lip portion formed at a peripheral edge portion of the wall portion engages the lip portion of an adjacent segment of the plurality of segments, so as to restrict further folding motion of the hinge mechanism.

In some implementations, the hinge mechanism further comprises an inner cover module. The at least one gear module may be received in a space formed between the inner cover module and the outer cover module. The at least one lock module may be coupled to an outer portion of the outer cover module.

In some implementations, the at least one gear module comprises a plurality of gear modules, arranged within the space between the inner cover module and the outer cover module. In some implementations, the at least one lock module comprises a plurality of lock modules symmetrically coupled to peripheral portion of the outer cover module. In some implementations, a plurality of lock modules are coupled to the or each one of the at least one gear module.

According to further aspect there is provided a foldable device comprising a housing, a foldable display coupled to the housing, and a hinge mechanism. The hinge mechanism may be a hinge mechanism as described above. The hinge mechanism may include one or more of the above features, in isolation, or in any combination with each other. The hinge mechanism may be received in the housing, at a position corresponding to a bendable section of the foldable display. The first end of the first link may be coupled to a first portion of the housing. The first end of the second link may be coupled to a second portion of the housing.

The foldable device may further include one or more of the below features, in isolation, or in any combination with each other. For example, in some embodiments, the outer cover module is coupled to an exterior facing side of the at least one gear module, between the first portion and the second portion of the housing. In some embodiments, the first link and the second link, and the first synchronizing member and the second synchronizing member, are configured to rotate symmetrically about a central axis of the gear module in response to an external force applied to the foldable device, so as to provide for synchronized movement of the first portion and the second portion of the housing.

In a further general aspect, there is provided a foldable device including a foldable layer and a hinge mechanism. The hinge mechanism may include at least one gear module that provides for synchronized movement of the hinge mechanism about a central plane of the hinge mechanism. A lock module may be coupled the hinge mechanism. The lock module may include a cam and a plate including a plurality of recesses. The lock module may selectively lock the hinge mechanism, and the foldable device, in one of a plurality of positions, based on a position of the cam in one of the recesses. The hinge mechanism and/or the foldable device may include one or more of the features described above in relation to the other general aspects.

It will be appreciated that features described in the context of, or in combination with, one aspect or implementation may be used in combination with other aspects described herein. For example, features described in combination with the hinge mechanism described above, may be combined with the foldable device also described above, and vice versa.

At least some of the above features that accord with the invention, and other features according to the invention, are set out in the claims.

BRIEF DESCRIPTION OF THE DRAWINGS

FIGS. 1A-1D illustrate an exemplary computing device including an exemplary foldable display.

FIGS. 3A-3F illustrate movement of an exemplary computing device including an exemplary foldable display, between an unfolded configuration and a folded configuration.

FIGS. 5A and 5B are schematic diagrams of an exemplary foldable display, illustrating a neutral layer of the exemplary foldable display.

FIGS. 8A and 8B are assembled perspective views, and FIG. 8C is an exploded perspective view, of an exemplary hinge mechanism, in accordance with implementations described herein.

FIGS. 10A-10D are cross-sectional views of the exemplary hinge mechanism shown in FIGS. 8A-8D, taken along line D-D of FIG. 8B.

FIGS. 12A and 12B are perspective views of a cover module of the exemplary hinge module, in accordance with implementations described herein.

DETAILED DESCRIPTION

Figure 2A:
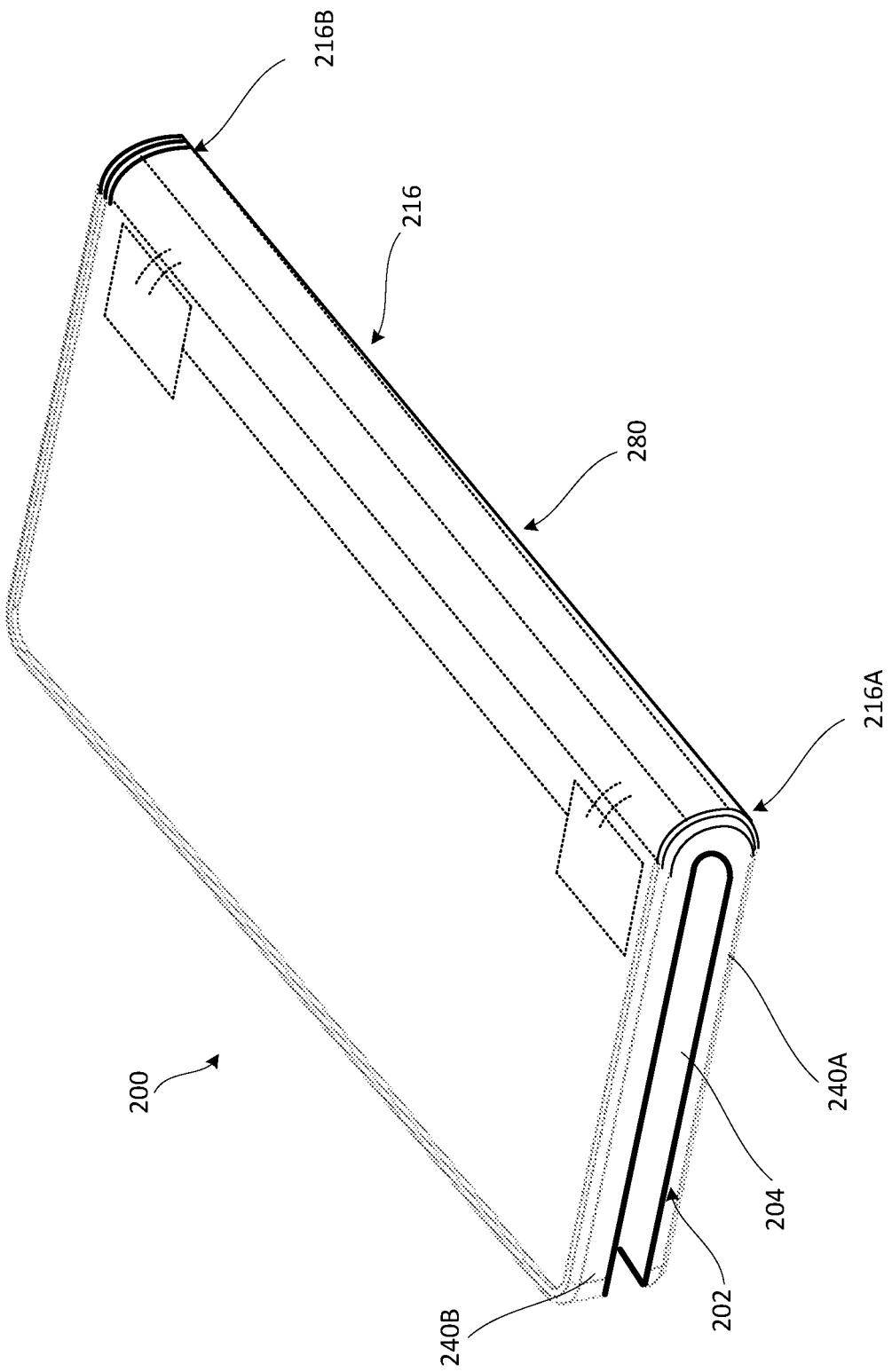
FIGS. 2A and 2B are perspective views of an exemplary computing device including an exemplary hinge mechanism, in a folded configuration and in an unfolded configuration, respectively, in accordance with implementations described herein.

A computing device including a hinge mechanism, in accordance with implementations described herein, may provide a relatively simple, and a relatively reliable, mechanism to support and guide the folding and the unfolding of a foldable display of the computing device while maintaining the foldable display within allowable bending radius limits, both in the folded configuration and in the unfolded configuration. In some implementations, the hinge mechanism may allow for a reduced stacking thickness in the folded configuration, while maintaining the foldable display within allowable bending radius limits. The relatively simple and reliable hinge mechanism, in accordance with implementations described herein, may guide and support the natural folding and unfolding of the computing device including the foldable display, while still providing support to the foldable display, and while still maintaining the foldable display within allowable bending radius limits.

FIGS. 1A-1D illustrate an exemplary computing device 100 that includes a foldable layer 102. In particular, FIG. 1A is a front view of the exemplary computing device 100 in an unfolded configuration. FIG. 1B is a perspective view of the exemplary computing device 100 in a partially folded configuration. FIG. 1C is a side view of the exemplary computing device 100 in a fully folded configuration. FIG. 1D is a perspective view of the exemplary computing device 100 in a partially folded configuration. In the exemplary computing device 100 shown in FIGS. 1B and 1C, the foldable layer 102 is a foldable display 102 that is mounted so that a display surface 104 faces inward in the folded configuration. In the exemplary computing device 100 shown in FIG. 1D, the foldable layer 102 is a foldable display 102 that is mounted so that a display surface 104 faces outward in the folded configuration. The foldable display 102 can include a flexible organic light emitting diode (OLED) layer.

In some implementations, the foldable display 102 can include a first relatively flat, relatively rigid, or-semi-rigid, section 112, a second relatively flat, relatively rigid, or semi-rigid, section 114, and a foldable portion or bendable section 116. In some implementations, the foldable display 102 can include more than two flat, rigid sections 112, 114 and/or more than one bendable section 116. In some implementations, the foldable display 102 can include zero, or only one, flat rigid section 112, 114. For example, when a foldable display 102 includes zero flat rigid sections, the foldable display 102 may be substantially continuously bendable, and may be rolled up, as in a scroll. The exemplary foldable display 102 shown in FIGS. 1A-1D includes an exemplary bendable section 116 that allows the foldable display 102 to bend about an axis. In some implementations, the foldable display 102 can include more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or radius of curvature. In some implementations, a hinge mechanism, in accordance with implementations described herein, may support and guide a folding and an unfolding of the foldable display 102 at the bendable section 116. In some implementations, the hinge mechanism, in accordance with implementations described herein, may be installed in the computing device 100, at a position corresponding to the bendable section 116 of the foldable display 102. In some implementations, the hinge mechanism may limit or restrict folding or bending of the foldable display 102 to within allowable bending parameters, to prevent damage to fragile components of the foldable display 102. For example, in the folded configuration shown in FIG. 1C, the hinge mechanism may prevent the foldable display 102 from bending beyond a minimum bending radius which may cause damage to components of the foldable display 102 (e.g., less than 10 millimeters, less than 5 millimeters, or less than 2 millimeters). In the unfolded configuration shown in FIG. 1A, the hinge mechanism may prevent the foldable display from bending beyond a maximum bending radius which may cause damage to components of the foldable display 102.

Figure 2B:
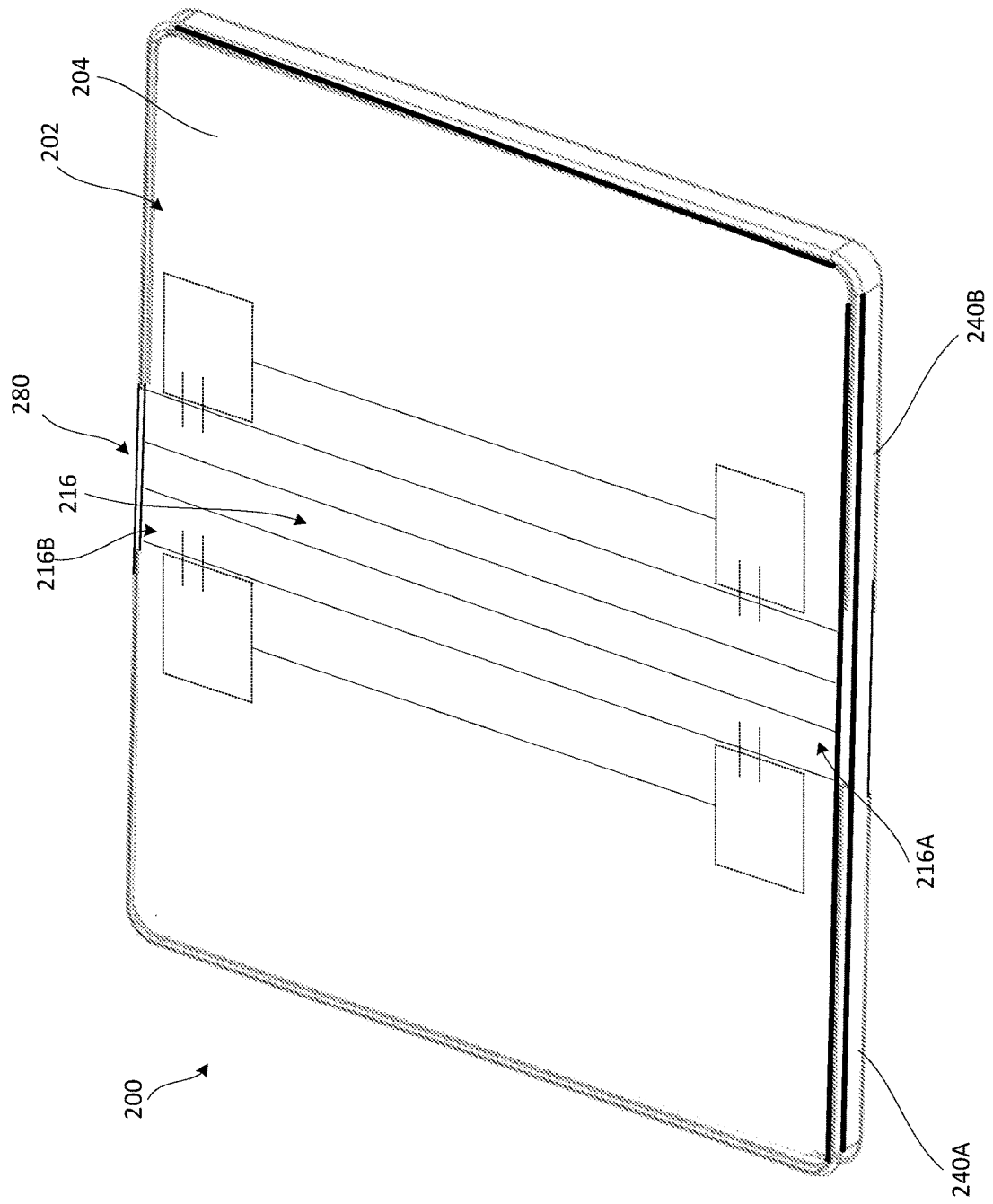

FIGS. 2A and 2B are perspective views of an exemplary computing device 200 including a foldable layer 202, such as, for example, a foldable display 202, supported by an exemplary hinge mechanism 280, in accordance with implementations described herein. The exemplary hinge mechanism 280 may be received in a housing 240 of the computing device 200, and positioned within the housing 240 at a position corresponding to a foldable portion 216, or bendable section 216 of the foldable display 202, for example, between a first housing 240A and a second housing 240B of the computing device 200. In FIG. 2A, the exemplary computing device 200 is in the folded configuration. In FIG. 2B, the exemplary computing device 200 is in the unfolded configuration. In the exemplary computing device 200 shown in FIGS. 2A and 2B, the foldable display 202 is mounted on the computing device 200 so that a display surface 204 of the foldable display 202 faces inward when the device 200 is in the folded configuration. However, in some implementations, the foldable display 202 may be mounted so that the display surface 204 faces outward when the device 200 is in the folded configuration (not shown).

In the exemplary computing device 200 shown in FIGS. 2A and 2B, the bendable section 216 of the foldable display 202 is at a central portion of the computing device 200, simply for purposes of discussion and illustration. In some implementations, the bendable section 216 may be located at positions other than the central portion of the computing device 200, and/or the foldable display 202 can include more bendable sections. In some implementations, the foldable display 202 can be substantially continuously bendable. In the exemplary foldable display 202 shown in FIGS. 2A and 2B, the bendable section 216 allows the foldable display 202 to bend about an axis.

The hinge mechanism 280, in accordance with implementations described herein, may be located in the computing device 200, at a position corresponding to the bendable section 216 of the foldable display 202. The hinge mechanism 280 may support and guide the folding and the unfolding of the foldable display 202. That is, the hinge mechanism 280 may provide for a relatively natural folding and unfolding motion between the folded configuration shown in FIG. 2A and the unfolded configuration shown in FIG. 2B. In some implementations, the hinge mechanism 280 may expand, or elongate, or slide, to accommodate the folding of the computing device 200 including the foldable display 202, and may retract, or shorten, or slide to accommodate the unfolding of the computing device 200 including the foldable display 202. In some implementations, the hinge mechanism 280 may limit, or restrict, an amount of bending or folding in the folded configuration, to prevent the foldable display 202 from bending beyond a minimum bending radius of the foldable display 202, and/or from bending beyond a maximum bending radius of the foldable display 202, which may result in damage to fragile components of the foldable display 202.

A computing device including a hinge mechanism, in accordance with implementations described herein, may support and guide a folding and unfolding of a foldable display of the computing device, while also maintaining the foldable display within allowable bending limits. In some implementations, the hinge mechanism may include components that move together with the motion of the flexible display, such that motion of moving, or pivoting, or rotating components of the hinge mechanism is coordinated with motion, and length, of a neutral layer of the flexible display, to prevent damage to the flexible display. In developing a hinge mechanism to accomplish this, particularly without the use of complex gearing and/or sliding mechanisms, a minimum bending radius of the foldable display, a center of rotation of the foldable display, positioning of a neutral layer of the foldable display, one or more virtual axes of rotation of one or more corresponding rotational components of the hinge mechanism, and other such factors may be taken into consideration.

Figures 3A, 3B:
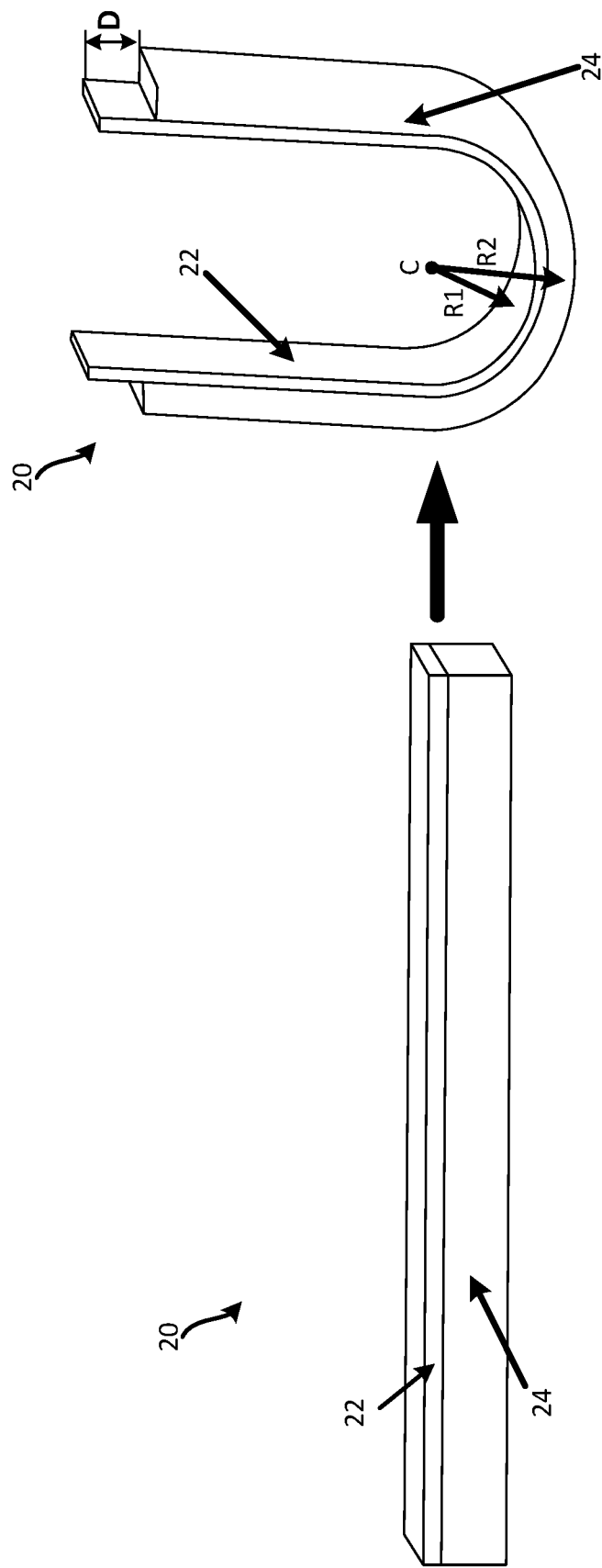

For example, FIG. 3A schematically illustrates an exemplary computing device 20 including a foldable display 22 (see also, FIGS. 4A and 4B) coupled to a housing 24 of the computing device 20. In this exemplary arrangement, the computing device 20 may be moved from the unfolded configuration shown in FIG. 3A to the folded configuration shown in FIG. 3B by rotating the foldable display 22 and the housing 24 coupled thereto about a center of rotation C of the foldable display 22. The difference in the radius R1 of the foldable display 22 and the radius R2 of the housing 24 in the folded configuration shown in FIG. 3B, produces a difference in bending length, or a stroke distance D, between the unfolded configuration shown in FIG. 3A and the folded configuration shown FIG. 3B. Without compensating for the stoke distance D, the folding of the computing device 20 including the foldable display 22 may cause damage to the foldable display 22 due to, for example, excessive compressive forces and/or tensile forces exerted on the foldable display 22 as the foldable display 22 is moved to the folded configuration.

FIGS. 3C and 3D illustrate the exemplary computing device 20 in which the housing 24 shown in FIGS. 3A and 3B is a split housing including a first body 24A and a second body 24B. To move from the unfolded configuration (shown in dotted lines) to the folded configuration (shown in solid lines), the foldable display 22 is rotated about the center of rotation C of the foldable display 22. However, in order to accommodate the folding and unfolding of the foldable display 22 and the associated difference in bending length, or stroke distance D, as described above, the first and second bodies 24A, 24B may be slidable, as shown in FIG. 3C, rather than adhered to the foldable display 22, as shown in FIG. 3D. In the arrangement shown in FIG. 3C, the center of rotation of the first body 24A and the second body 24B is not necessarily the same as the center of rotation C of the foldable display 22. In this situation, a center of rotation of the first and second bodies 24A, 24B of the computing device 20 may be determined, separately from the center of rotation C of the foldable display 22.

Figure 3F:
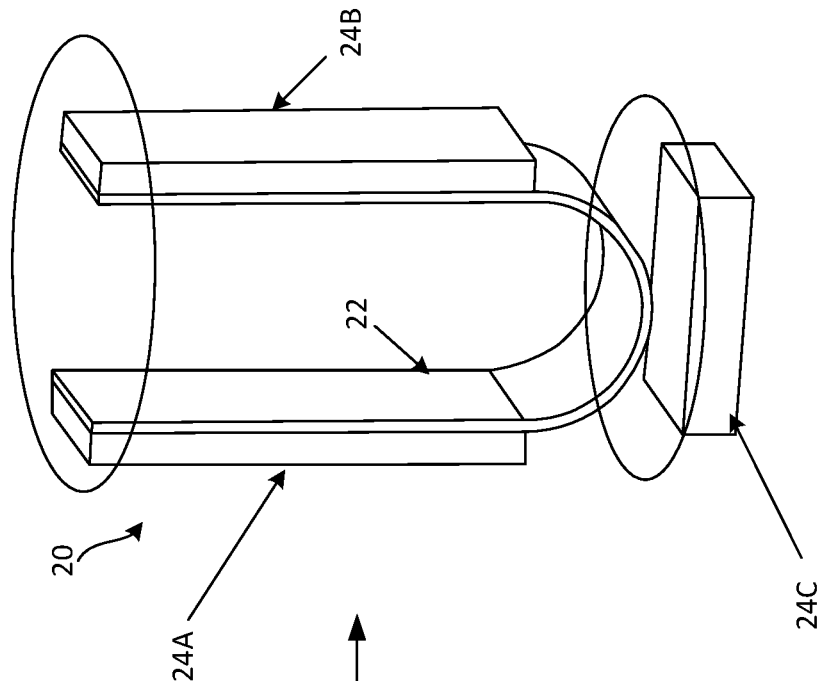
Figure 3E:
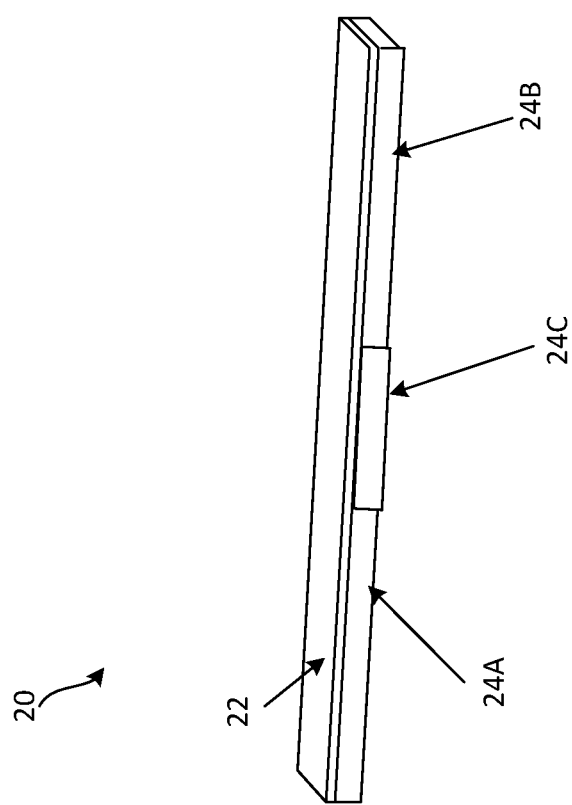

FIGS. 3E and 3F illustrate the exemplary computing device 20 in which the housing 24 shown in FIGS. 3A and 3B is a split housing including the first body 24A, the second body 24B, and a third body 24C positioned between the first and second bodies 24A, 24B. In this arrangement, the first and second bodies 24A, 24B may be coupled, for example, adhered, to corresponding first and second portions of the foldable display 22, while the third body 24C may provide for the above described change in length between the unfolded and folded configuration. In this arrangement, alignment of the foldable display 22 and the first and second bodies 24A, 24B of the housing 24 may be maintained, while the third body 24C guides the folding and unfolding motion of the computing device 20, in effect maintaining a desired shape/contour of the bendable section of the foldable display 22, and maintaining the foldable display 22 within allowable bending limits. The third body 24C may also provide for enclosure of the intermediate portion of the computing device 20, between the first and second bodies 24A, 24B, corresponding to the bendable section of the foldable display 22.

Figure 4A:
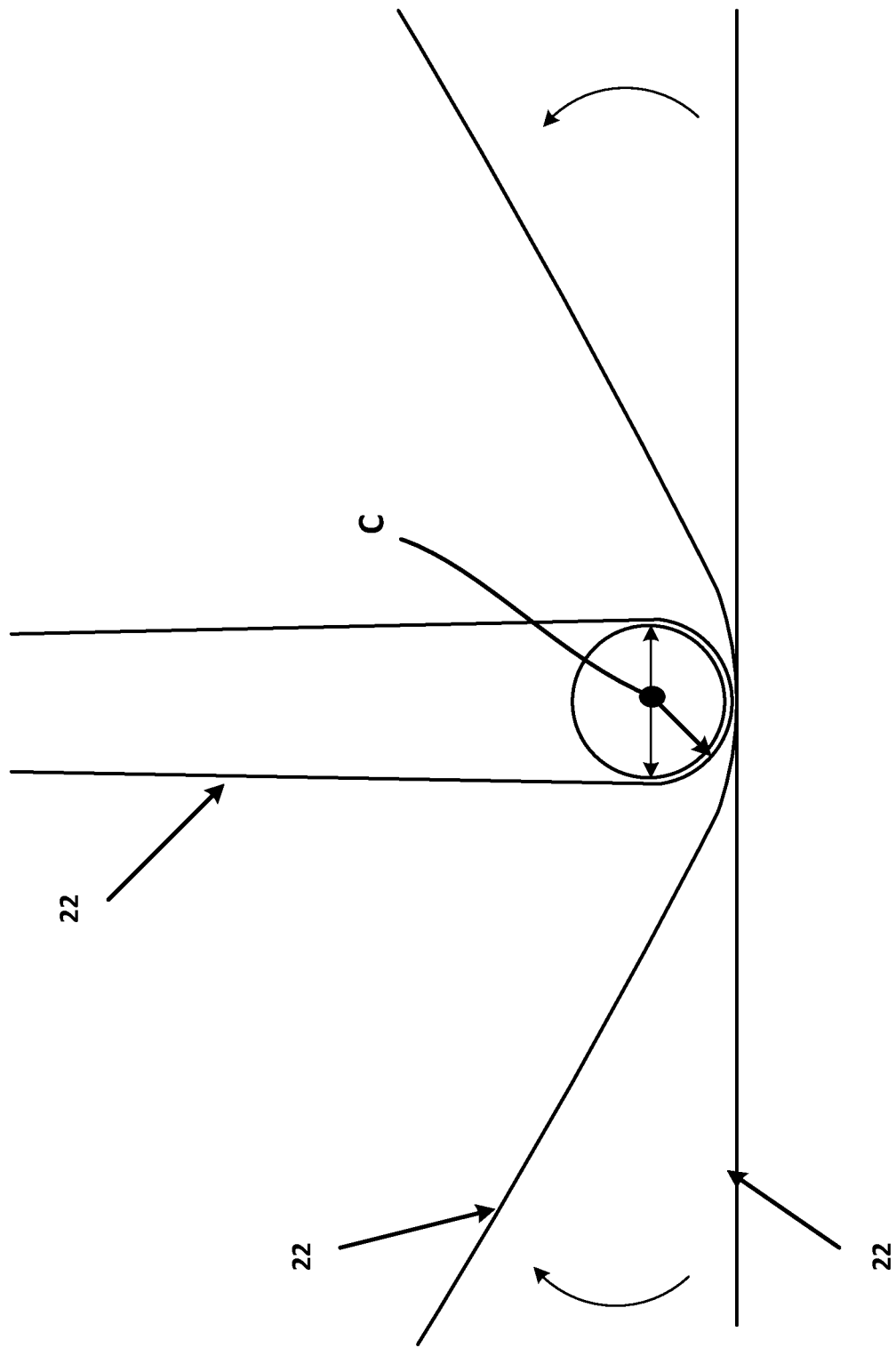
FIG. 4A is a schematic diagram of the bending of an exemplary foldable display, between an unfolded configuration and a folded configuration.
Figure 4B:
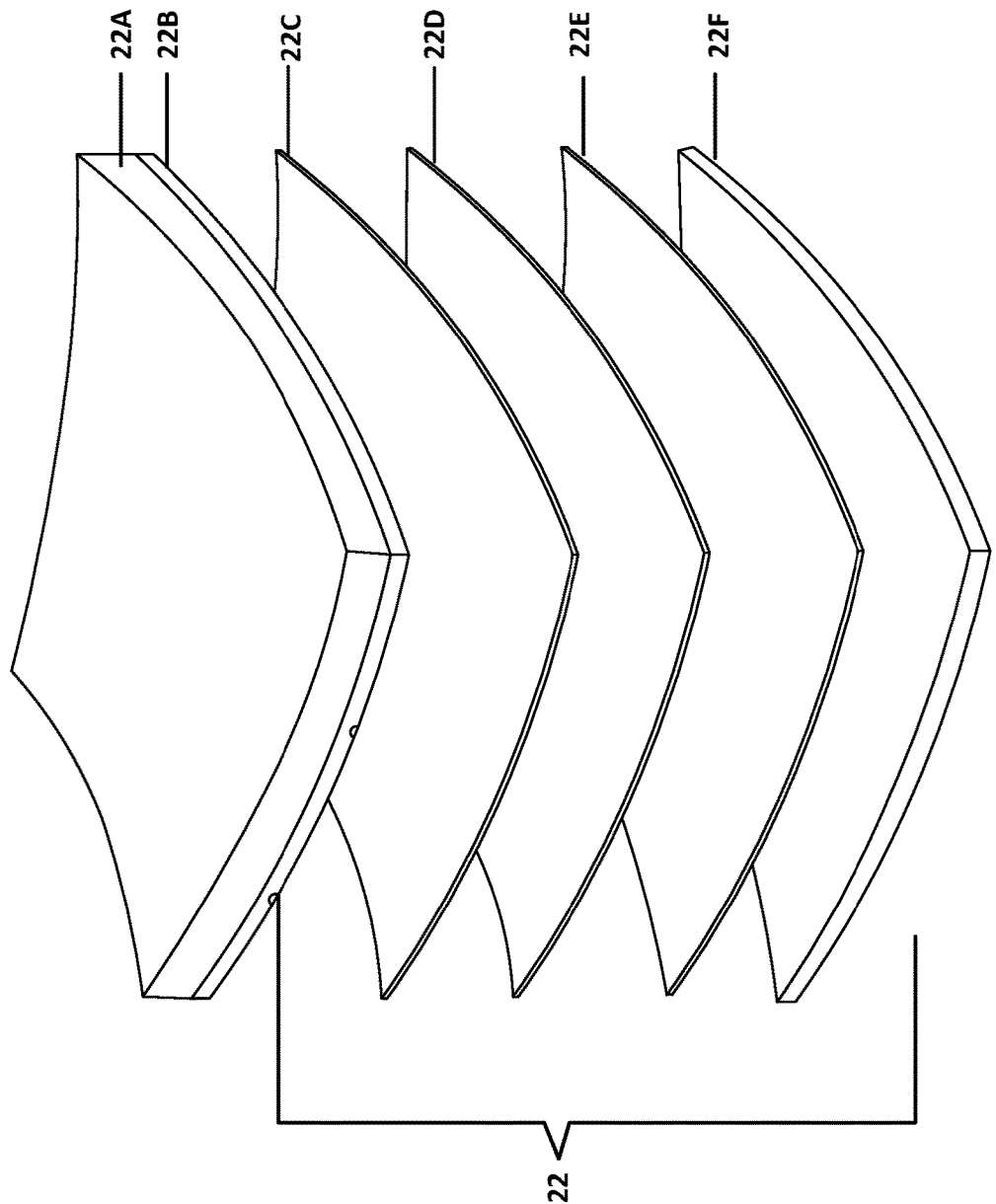
FIG. 4B is an exploded perspective view of an exemplary foldable display.

As shown in FIG. 4A, and as described above, in moving from the unfolded configuration to the folded configuration, the foldable display 22 may be bent, about a center of rotation C. A radius of the bendable section of the foldable display 22 may be maintained within allowable limits, for example, between a minimum bending radius (in the fully folded configuration) and a maximum bending radius (in the fully unfolded configuration) to prevent excessive compressive and/or tensile forces that would damage fragile components of the foldable display 22. In some implementations, the foldable display 22 may include multiple layers, as shown in FIG. 4B. In an arrangement in which the foldable display 22 is an OLED panel, the foldable display 22 may include multiple exemplary layers such as, for example, the exemplary layers 22A through 22F shown in FIG. 4B. For example, in some implementations, the foldable display 22 may include a substrate layer 22A, an anode layer 22B, one or more conductive layers 22C, 22E, an emissive layer 22D, and a cathode layer 22F. In some implementations, the foldable display 22 can include more, or fewer, layers and/or combinations of layers, arranged as shown in FIG. 4B, or differently arranged.

FIG. 5A is a schematic view of an exemplary section of the foldable display 22 in an unfolded configuration. FIG. 5B is a schematic view of the exemplary section of the foldable display 22 in a folded/partially folded configuration. In some implementations, a neutral axis 25, or a neutral layer 25, of the foldable display 22 may be defined in a portion of the foldable display 22 in which an unfolded length L of the foldable display 22 is substantially equal to a folded length L of the foldable display 22. For example, in some implementations, the neutral axis 25 of the foldable display 22 may be between a first portion 26 of the foldable display 22 that is in compression in the folded configuration, and a second portion 28 of the foldable display 22 that is in tension in the folded configuration. That is, in some implementations, the neutral axis 25 may be positioned along a portion of the foldable display 22 that is neither in compression nor in tension when the foldable display 22 is folded or bent. In some implementations, fragile components of the foldable display 22 may be positioned along the neutral axis 25. Positioning of the fragile components along, or within, the neutral axis 25 of the foldable display 22 may protect the fragile components from damage as the foldable display 22 is folded and unfolded.

A hinge mechanism, in accordance with implementations described herein, may allow a housing, for example, separate portions of the housing, to rotate about separate, respective centers of rotation, while the foldable display rotates about its center of rotation C. In some implementations, components of the hinge mechanism, in accordance with implementations described herein, may rotate about respective centers of rotation corresponding to a respective virtual axis outside the hinge mechanism. In some implementations, components of the hinge mechanism, in accordance with implementations described herein, may rotate about respective centers of rotation which follow a neutral axis of the foldable display. In some implementations, components of the hinge mechanism may rotate about respective centers of rotation corresponding to a respective virtual axis outside the hinge mechanism, with the virtual axis substantially coinciding with a neutral axis of the foldable display.

Figure 6A:
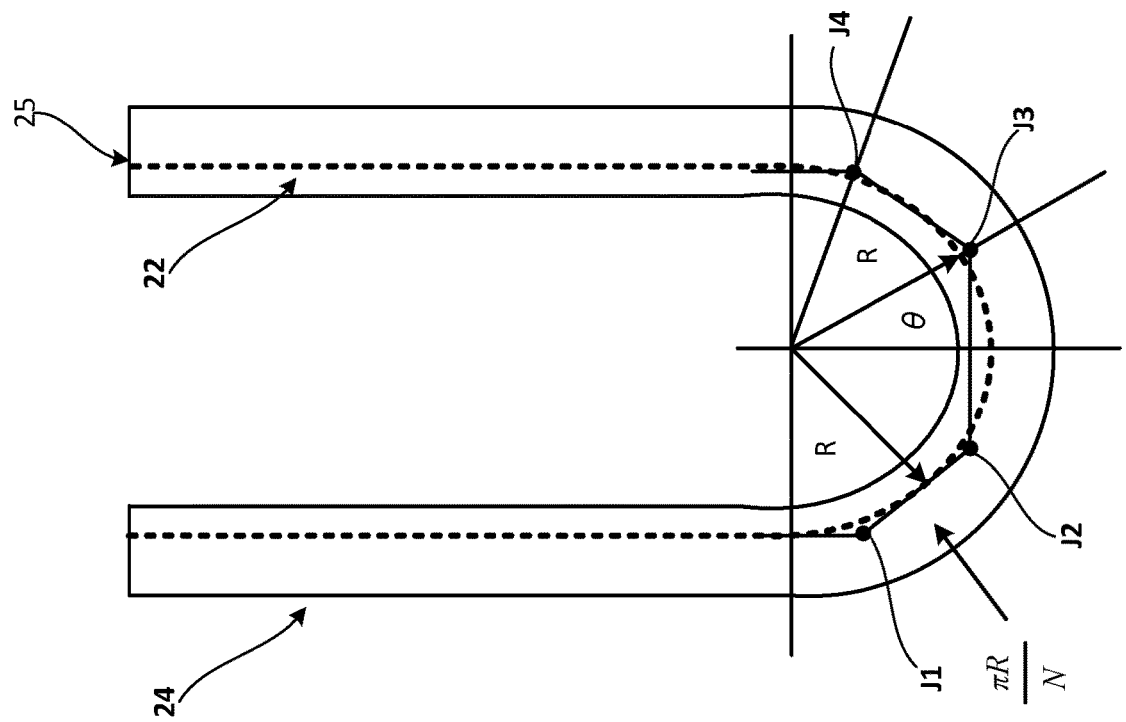
FIGS. 6A-6C are schematic diagrams illustrating the determination of a virtual axis and virtual joints for movement of a multiple-axis hinge mechanism, in accordance with implementations described herein.
Figure 6B:
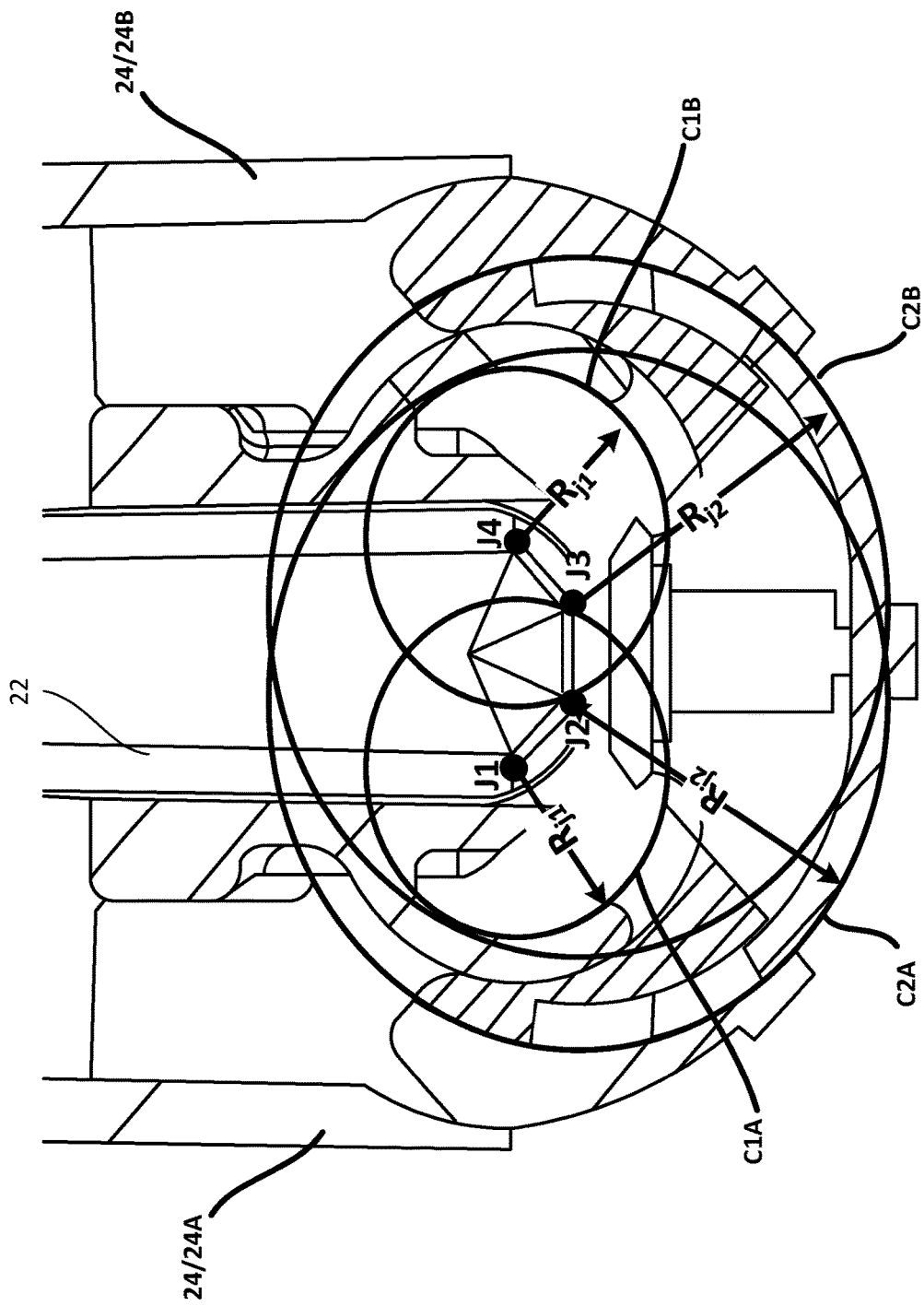
Figure 6C:
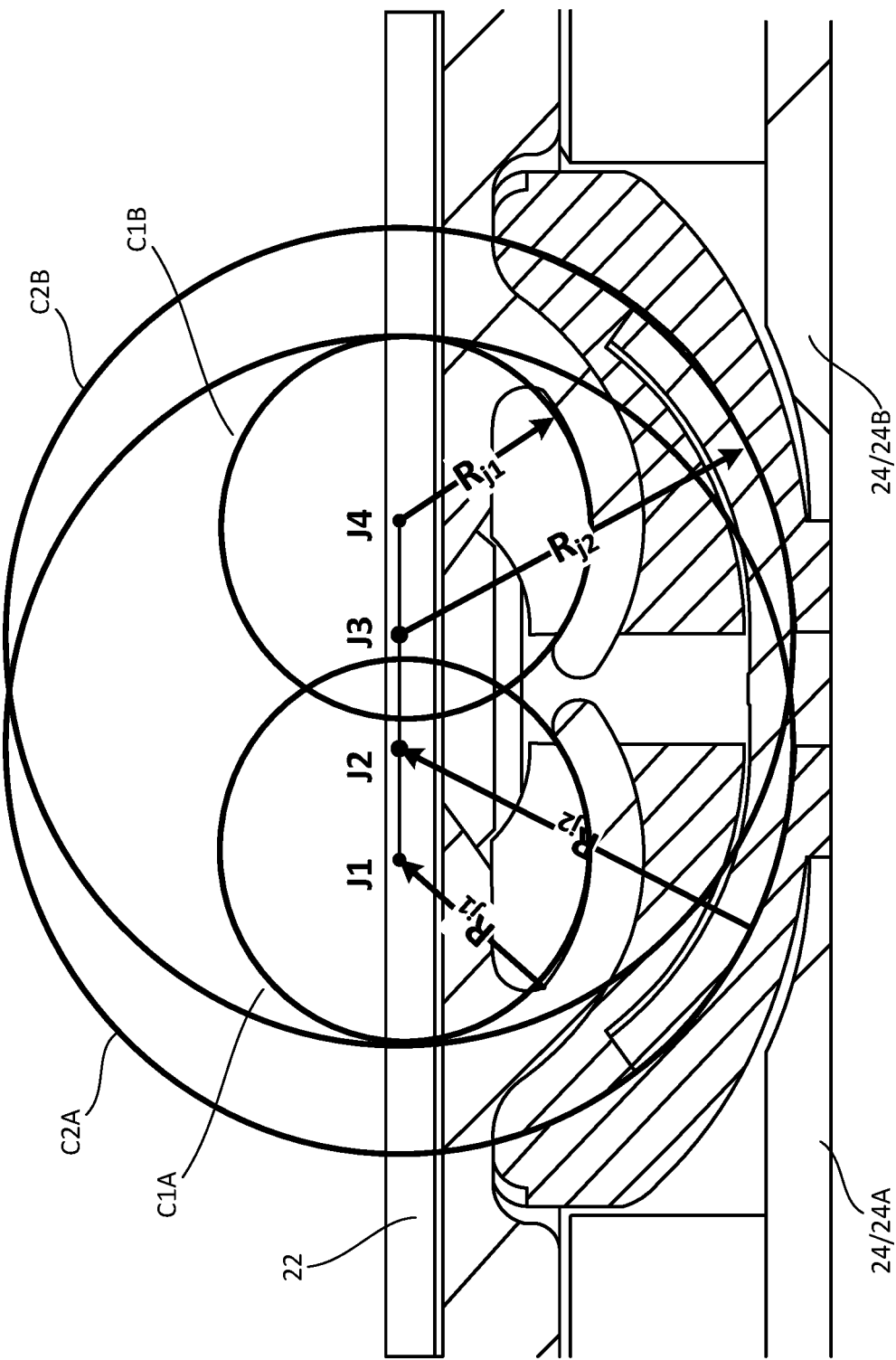

FIG. 6A schematically illustrates an exemplary method of determining a center of rotation for each of a plurality of joints, or segments, of a hinge mechanism, in accordance with implementations described herein. FIGS. 6B and 6C are exemplary cross-sectional views, of an exemplary hinge including multiple joints, in a folded configuration and an unfolded configuration, respectively, in which the method described with respect to FIG. 6A may be applied. The exemplary implementation illustrated in FIG. 6A includes a mechanism having a number N of joints, or pivot axes, or axes of rotation. The neutral layer 25 has a radius R from the center of rotation of the foldable display 22, with a length L of the neutral layer 25 being substantially the same in the folded and unfolded configurations, as described above with respect to FIGS. 5A and 5B. Thus, the length of the neutral layer 25 may be equal to $\pi R$ (assuming the bendable section of the foldable display 22 follows a substantially semicircular contour in the folded configuration). Each of the plurality of segments pivoting about the number N of joints, or pivot axes, of the multiple axis hinge mechanism, in accordance with implementations described herein, may be designed to cover $\pi/N$ degrees, and a distance of $\pi R/N$. Each of the joints, or pivot axes, may have a virtual joint radius $R_j$. The centers of rotation for the multiple axis virtual joints may then be calculated in accordance with the Equations 1 through 3, below.

$$R_j \sin \theta = \pi R/2N \quad \text{Equation 1}$$

$$\theta = \pi/2N \quad \text{Equation 2}$$

$$R_j = \pi R/[2N \sin(\pi/2N)] \text{ where } \lim R_j = RN \to \infty \quad \text{Equation 3}$$

Determination of the virtual rotational axis of each of the N joints, or pivot axes, of the hinge mechanism including a plurality of segments in this manner may set movement of the individual segments of the hinge mechanism so that motion of the foldable display 22 remains at the neutral layer. With $R_j$ being the radius at each joint, and R being the radius at the neutral layer 25, as the number of segments and the corresponding number of joints, or pivot axes, increases, the virtual joint radius $R_j$ gets closer to the radius R at the neutral axis 25.

In the exemplary arrangement shown in FIGS. 6A-6C, after the multiple axis center of rotation is determined, four exemplary pivot axes, or joints J1, J2, J3 and J4 are determined as described above (i.e., N=4), each joint J1 through J4 having a radius $R_j$ at the neutral layer. The four exemplary pivot axes, or joints J1 through J4 are shown relative to an exemplary hinge mechanism in FIGS. 6B and 6C. In particular, FIG. 6B is a cross-sectional view of the exemplary hinge mechanism in the folded configuration, and FIG. 6C is a cross-sectional view of the exemplary hinge mechanism in the unfolded configuration. In the exemplary arrangement shown in FIGS. 6B and 6C, a first substantially circular path C1A is centered on the joint J1, having a radius $R_{j1}$. A second substantially circular path C2A is centered on the joint J2, having a radius $R_{j2}$. The first and second circular paths C1A and C2A are mirrored (as circular paths C1B and C2B, respectively) for the third and fourth joints J3 and J4, respectively. In this arrangement, the radius $R_{j1}$ of the circular path C1 is less than the radius $R_{j2}$ of the circular path C2, for the joint J1/J2 and the joints J3/J4. This may allow for components associated with the first joint J1 to be received into and extended out of components associated with the second joint J1, and similarly, for components associated with the fourth joint J4 to be received into and extended out of components associated with the third joint J3, as the device is moved between the folded and unfolded configurations. This may reduce the amount of space occupied by the mechanical structure of the hinge mechanism, while also providing for the desired support and guidance through the folding and unfolding motion.

Figure 7A:
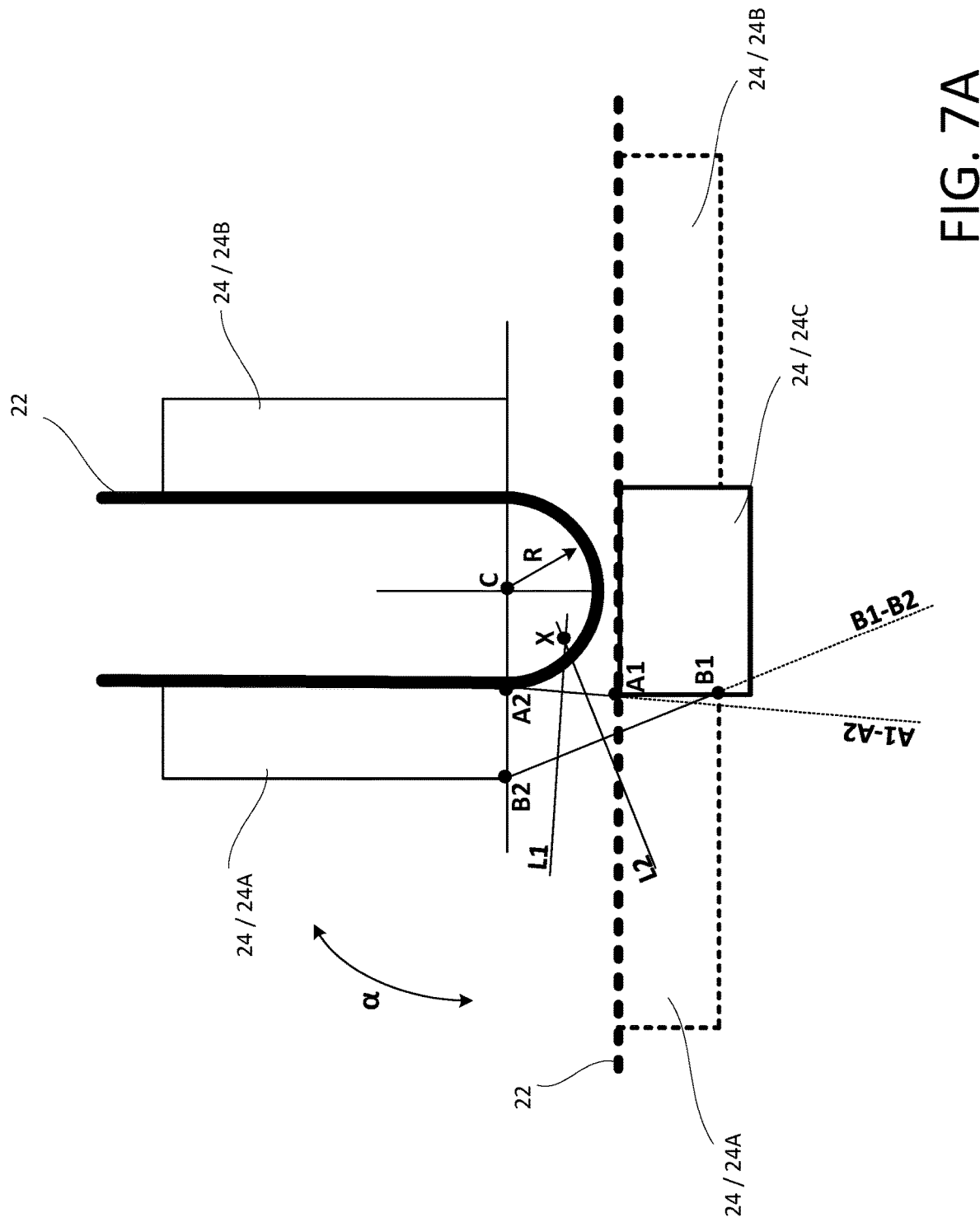
FIGS. 7A-7D are schematic diagrams illustrating the determination of a virtual axis of rotation for a hinge mechanism corresponding to a neutral layer of a foldable display, in accordance with implementations described herein.
Figure 7B:
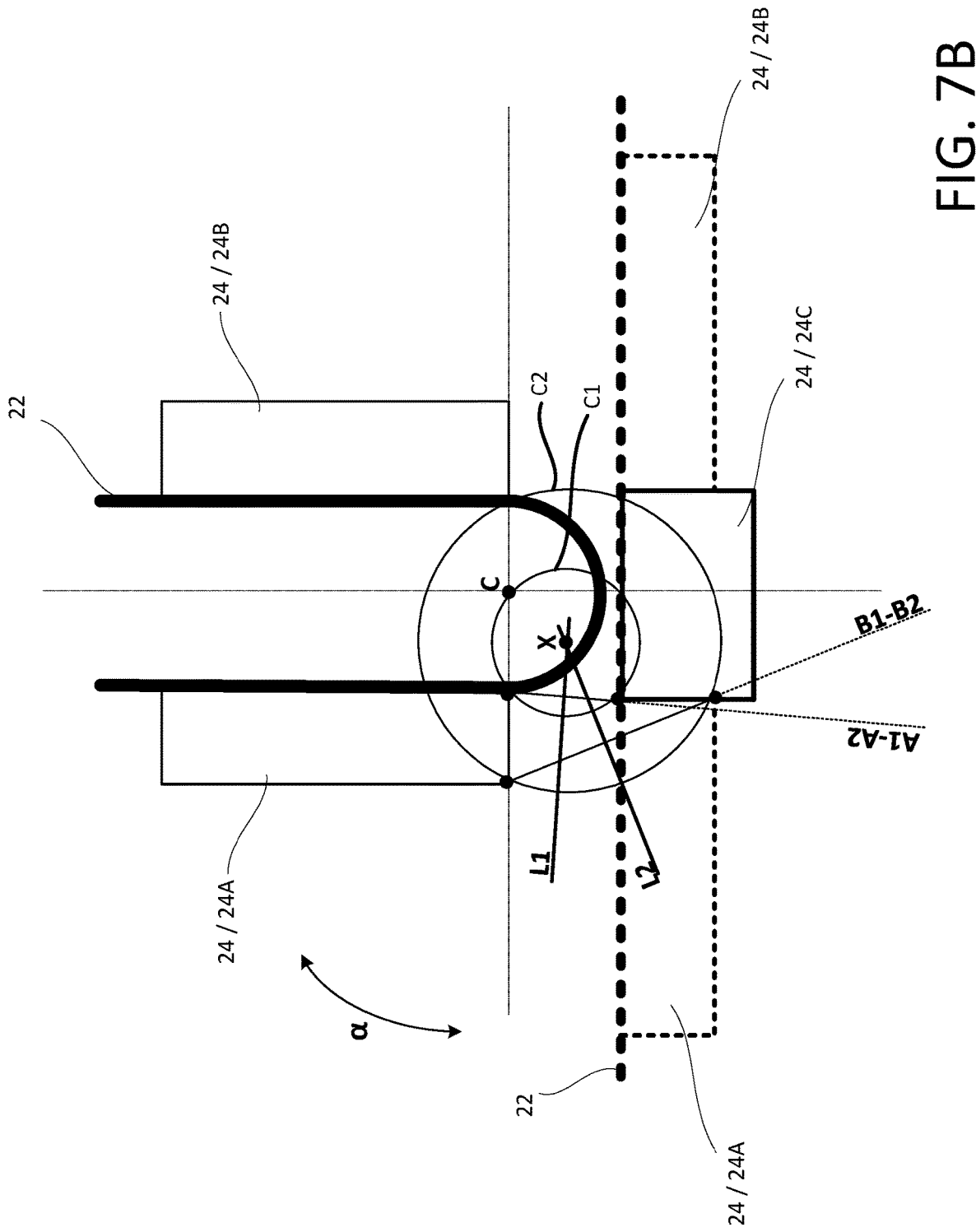
Figure 7C:
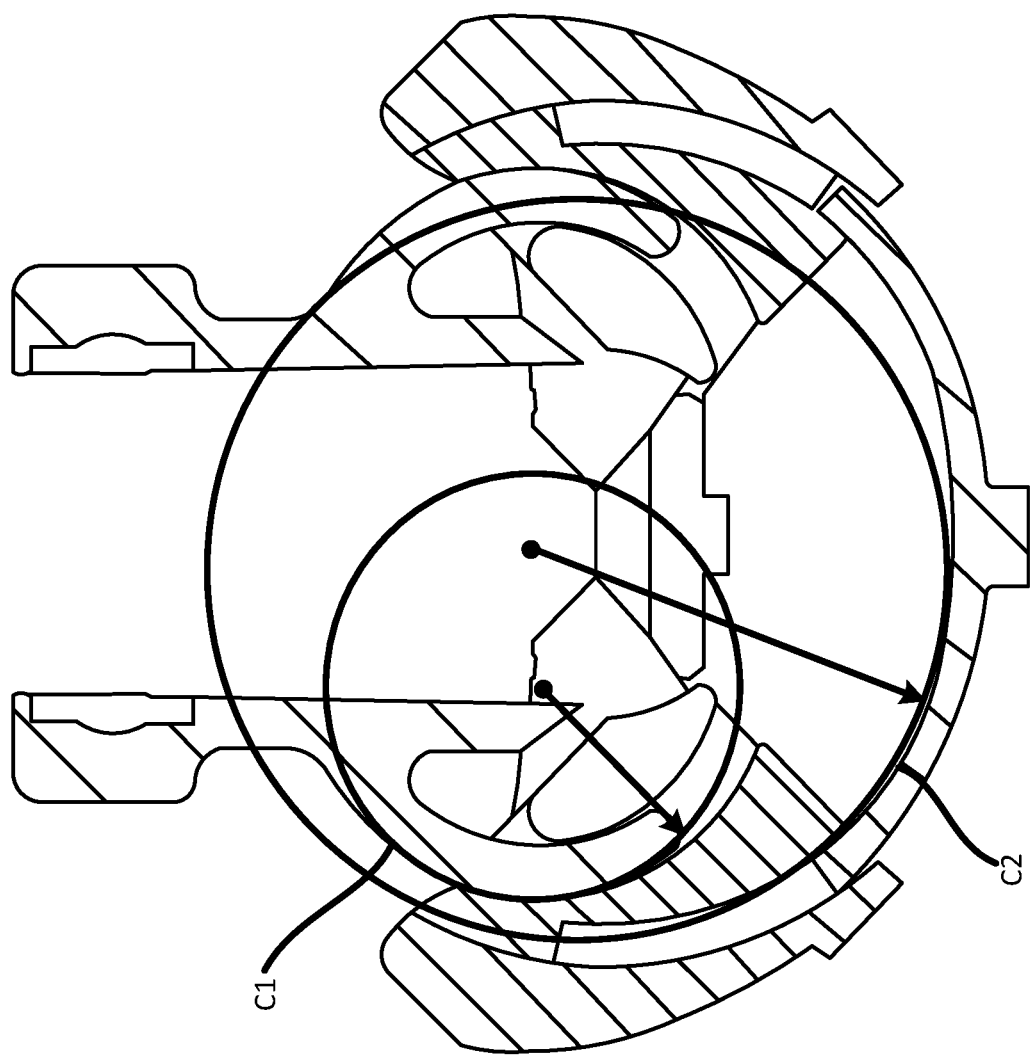
Figure 7D:
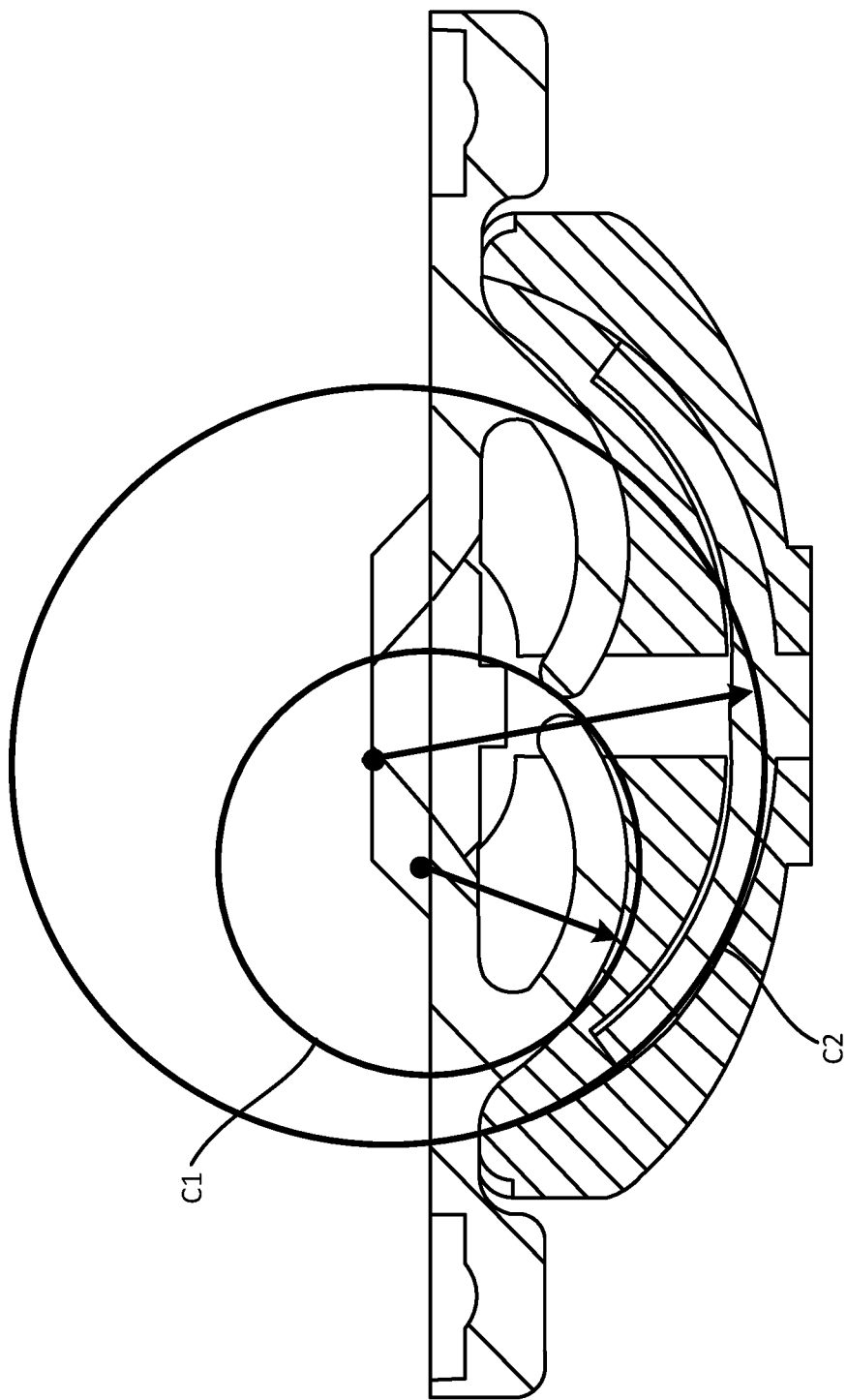

FIGS. 7A and 7B are schematic diagrams illustrating another method for determining virtual axes of rotation for multiple joints, or segments, of a hinge mechanism, in accordance with implementations described herein, as the exemplary computing device 20 moves from an initial configuration (for example, the unfolded configuration, shown in dotted lines) to a final configuration (for example, the folded configuration, shown in solid lines). FIGS. 7C and 7D are exemplary cross-sectional views, of an exemplary hinge including multiple joints, in a folded configuration and an unfolded configuration, respectively, in which the method described with respect to FIGS. 7A and 7B may be applied. Hereinafter, simply for purposes of discussion and illustration with respect to FIGS. 7A and 7B, the first body 24A and the second body 24B will simply be referred to as a device body 24. Determination of the virtual axis of rotation may be mirrored on the opposite portion of the computing device 20.

As shown in FIGS. 7A and 7B, reference points A and B may be designated on the device body 24, for example, at upper and lower end portions of the rotating end of the device body 24. In rotating the device body 24 from the initial position, through the angle α to the final position, the first reference point moves from an initial position A1 to a final position A2. Similarly, the second reference point moves from an initial position B1 to a final position B2. A line A1-A2 may be drawn connecting the points A1 and A2, and a line B1-B2 may be drawn connecting the points B1 and B2. A first line L1, bisecting the line A1-A2, may then be drawn, and a second line L2, bisecting the line B1-B2, may be drawn, as shown in FIG. 7A. The point X at which the first line L1 and the second line L2 intersect may define the virtual axis, or virtual center of rotation X of the device body 24.

As shown in FIGS. 7B through 7D, a first circle C1 and a second circle C2 may each be centered on the point of intersection X between the lines L1 and L2 defining the virtual axis of rotation. The first circle C1 may define a trace, or path, or contour, to be followed by components of the hinge mechanism corresponding to the reference point A of the device body 24. The second circle C2 may define a trace, or path, or contour, to be followed by components of the hinge mechanism corresponding to the reference point B of the device body 24. As noted above, the process described above with respect to FIGS. 7A and 7B may be applied similarly to the first body 24A and to the second body 24B. In this example, the exemplary reference points A and B are positioned at corners of the device body 24, simply for ease of discussion and illustration. However, in some implementations, other reference points may be selected at the rotational end portion of the device body 24, and the process described above may be used to determine the center of rotation X of the device body 24.

As described above, the first and second circular paths C1 and C2 are shown only on one the side of the device associated, associated with a first portion of the hinge mechanism and the first housing 24A, simply for ease of discussion and illustration. The first and second circular paths C1 and C2 may be mirrored for a second portion of the hinge mechanism and the second housing 24B. With the first and second circles C1 and C2 defining the path that the reference points A and B of the first and second housings 24A, 24B will follow, a trace of the movement of the components of the hinge mechanism may be as shown in FIGS. 7C and 7D. That is, in this arrangement, the radius of the circular path C1 may be less than the radius of the circular path C2, and may be less than the radius of a third circular path C3 defined by a shroud or cover in which the hinge mechanism is received. This may reduce the amount of space occupied by the mechanical structure of the hinge mechanism, while also providing for the desired support and guidance through the folding and unfolding motion.

Figure 8B:
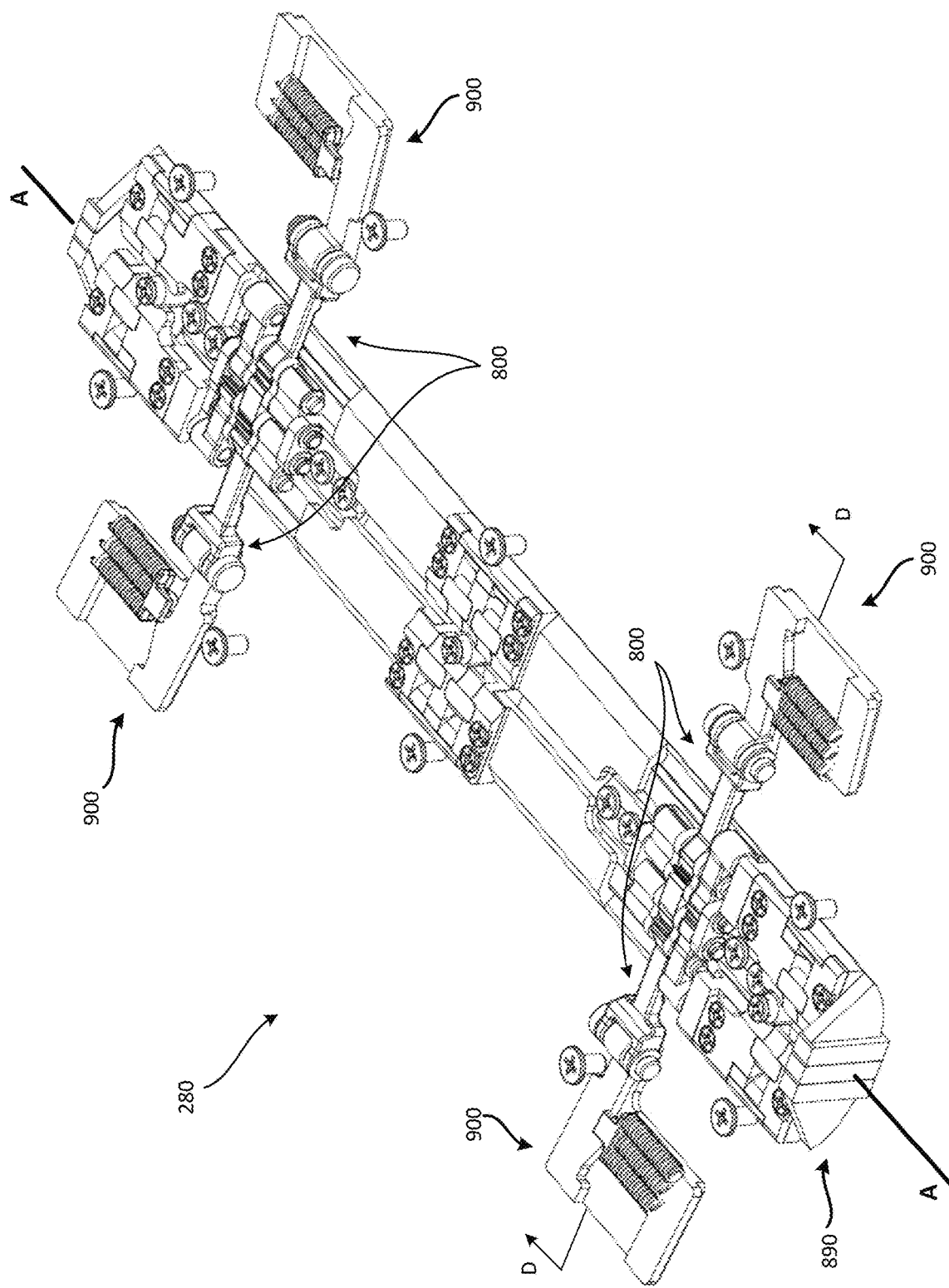
Figure 8D:
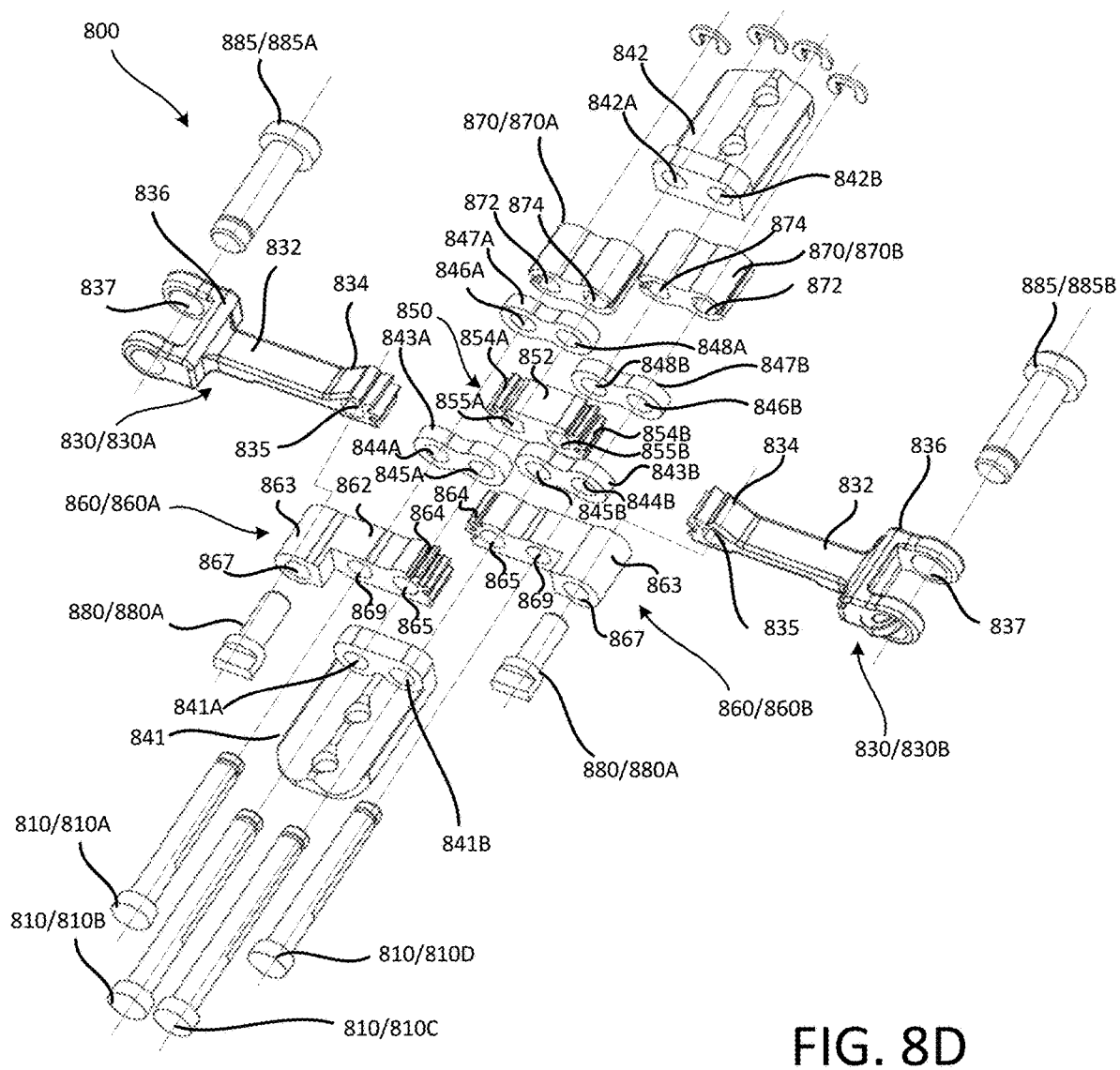
FIG. 8D is an exploded perspective view of an exemplary gear module of the exemplary hinge module shown in FIGS. 8A-8C, in accordance with implementations described herein.

FIGS. 8A-8C are perspective views of an exemplary hinge mechanism 280, in accordance with implementations described herein. In particular, FIG. 8A is an assembled perspective view of the exemplary hinge mechanism 280. FIG. 8B is a perspective view of the exemplary hinge mechanism 280 shown in FIG. 8A, with an inner cover module 895 removed, so that internal components of the exemplary hinge mechanism 280 are visible. FIG. 8C is an exploded perspective view of the exemplary hinge mechanism 280 shown in FIGS. 8A and 8B. FIG. 8D is an exploded perspective view of an exemplary gear module 800 of the exemplary hinge mechanism 280 shown in FIGS. 8A-8C.

In some implementations, the hinge mechanism 280 may include one or more gear modules 800 positioned along the length of the hinge mechanism 280 to support and guide movement of the hinge mechanism 280 between the folded and unfolded configurations. In some implementations, the one or more gear modules 800 may provide for the symmetrical movement of the hinge mechanism 280, and a computing device/foldable display coupled thereto, about a central plane A (see FIGS. 9A and 9B; i.e., a central plane A extending vertically from the central axis A shown in FIG. 8B). In some implementations, the one or more gear modules 800 may provide for the coordinated, synchronized movement of opposite sides of the hinge mechanism 280, coupled to first and second portions of the housing of the computing device. In the exemplary arrangement shown in FIGS. 8A-8C, the exemplary hinge mechanism 280 includes two hinge modules 800, simply for purposes of discussion and illustration. The number and/or the positioning of the hinge module(s) 800 in the hinge mechanism 280 may vary based on, for example, a form factor of the computing device in which the hinge mechanism is installed, an allowable bending radius of a foldable display coupled to the computing device, and other such factors.

In some implementations, the hinge mechanism 280 may include one or more slide modules 900, or lock modules 900. In some implementations, the slide module(s) and lock module(s) may be combined, to provide for both a sliding motion and a locking function. The slide/lock module(s) 900 may provide for relative movement between the housing in which the slide/lock module 900 is coupled, and the gear module 800 coupled to the slide/lock module 900. In some implementations, the slide/lock module 900 may selectively lock a position of the hinge mechanism 280. For example, in some implementations, the one or more slide/lock modules 900 may restrict rotation of the hinge mechanism 280, and the computing device/foldable display, beyond a minimum bend radius of the foldable display and/or beyond a maximum bend radius of the foldable display. In some implementations, the one or more slide/lock modules 900 may maintain a desired position of the hinge mechanism 280, and the computing device/foldable display.

FIG. 8D is an exploded view of the example gear module 800. In some implementations, each gear module 800 may include a plurality of links 830. In this exemplary arrangement, each gear module 800 includes a first link 830A that couples the gear module 800 to a housing of a computing device, for example, to the first housing 240A of the exemplary computing device 200 shown in FIGS. 2A and 2B, and a second link 830B that couples the gear module 800 to the second housing 240B of the exemplary computing device 200 shown in FIGS. 2A and 2B. Each link 830 may include a body 832 with a gear 834 at a first end portion of the body 832, surrounding an opening 835, and a coupling portion 836, including one or more slots 837, at a second end portion of the body 832. The links 830 (i.e., the first and second links 830A, 830B) may engage a central synchronizing gear 850. The central synchronizing gear 850 may include a body 852 having a first gear 854A at a first end portion of the body 852, surrounding a first opening 855A, and a second gear 854B at a second end portion of the body 852, surrounding a second opening 855B. The first gear 854A meshes with the gear 834 of the first link 830A, and the second gear 854B meshes with the gear 834 of the second link 830B. The meshing of the gears 854A, 854B of the central synchronizing gear 850 with the gears 834 of the first and second links 830A, 830B may, at least in part, provide for the synchronized, coordinated movement of the first and second links 830A, 830B, in a symmetrical manner about the central plane A shown in FIGS. 9A and 9B.

As shown in FIG. 8D, each gear module 800 may include a pair of synchronizing members 860, for example, a first synchronizing member 860A and a second synchronizing member 860B. Each of the synchronizing members 860 may include a body 862 having a gear 864 at a first end portion of the body 862, surrounding an opening 865. A coupling portion 863 may be formed at a second end portion of the body 862, surrounding an opening 867. The gear 864 of the first synchronizing member 860A may mesh with the gear 864 of the second synchronizing member 860B. The meshing of the gears 864 of the synchronizing members 860 (i.e., the first synchronizing member 860A and the second synchronizing member 860B) may, at least in part, provide for the synchronized, coordinated movement of the first and second synchronizing members 860A, 860B, in a symmetrical manner about the central plane A shown in FIGS. 9A and 9B.

As shown in FIG. 8D, a plurality of pins 810 may extend through various components of the gear module 800, such that the pins 810 couple the various components, and the components rotate about the pins 810 in response to an externally applied force, to guide the motion of the gear module 800, and the computing device/foldable display. For example, in this exemplary arrangement, a first pin 810A extends through a central opening 869 in the first synchronizing member 860A, through an opening 844A in a first spacer 843A, through an opening 846A in a second spacer 847A, and into an opening 872 in a first torque bracket 870A. In some implementations, the first pin 810A is press fit into the opening 872 in the first torque bracket 870A such that a frictional force maintains a relative position therebetween. A second pin 810B extends through a first opening 841A in the first bracket 841, through the opening 865 in the first synchronizing member 860A, through an opening 845A in the first spacer 843A, through the opening 855A in the in the central synchronizing gear 850, through an opening 848A in the second spacer 847A, through an opening 874 in the first torque bracket 870A, and into a first opening 842A in a second bracket 842. Similarly, a third pin 810C extends through a second opening 841B in the first bracket 841, through the opening 865 in the second synchronizing member 860B, through an opening 845B in a spacer 843B, through the opening 855B in the in the central synchronizing gear 850, through an opening 846B in a spacer 847B, through an opening 872 in a second torque bracket 870B, and into a second opening 842B in the second bracket 842. Like the first pin 810A, a fourth pin 810D extends through a central opening 869 in the second synchronizing member 860B, through an opening 844B in the spacer 843B, through an opening 848B in a second spacer 847B, and into an opening 874 in the second torque bracket 870B. In some implementations, the fourth pin 810D is press fit into the opening 874 in the second torque bracket 870B such that a frictional force maintains a relative position therebetween. The first and second torque brackets 870A, 870B may be referred to as first and second torsion members, respectively. The coupling of the first and second links 830A, 830B, the first and second synchronizing members 860A, 860B and the central synchronizing gear 850 by the pins 810 in this manner provide for the rotation of these elements of the hinge mechanism 280 about the separate, respective pivot axes, such as, for example, the multiple joints J1, J2, J3 and J4 described above with respect to FIGS. 6A-6C.

A first slide pin 880A extends through the opening 867 in the first synchronizing member 860A and into the opening 835 in the first link 830A. A second slide pin 880B extends through the opening 867 in the second synchronizing member 860B and into the opening 835 in the second link 830B. A first slide pin 885A extends through the slots 837 in the first link 830A to couple the first link 830A to a corresponding slide/lock module 900 (to be described below). A second slide pin 885B extends through the slots 837 in the second link 830B to couple the second link 830B to a corresponding slide/lock module 900. The connection of the links 830 to the slide/lock modules 900 will be described below in more detail.

In some implementations, an outer cover module 890 may surround an outward facing side of the hinge mechanism 280, to guide a movement of the hinge mechanism 280, and/or to enclose/protect the hinge mechanism 280. In some implementations, an inner cover module 895 may be positioned on an inward facing side of the hinge mechanism 280, between the hinge mechanism 280 and the foldable display, so that discontinuities due to the components of the hinge mechanism 280 are not felt or seen at the surface of the foldable display when the computing device is in the unfolded configuration.

Figure 9A:
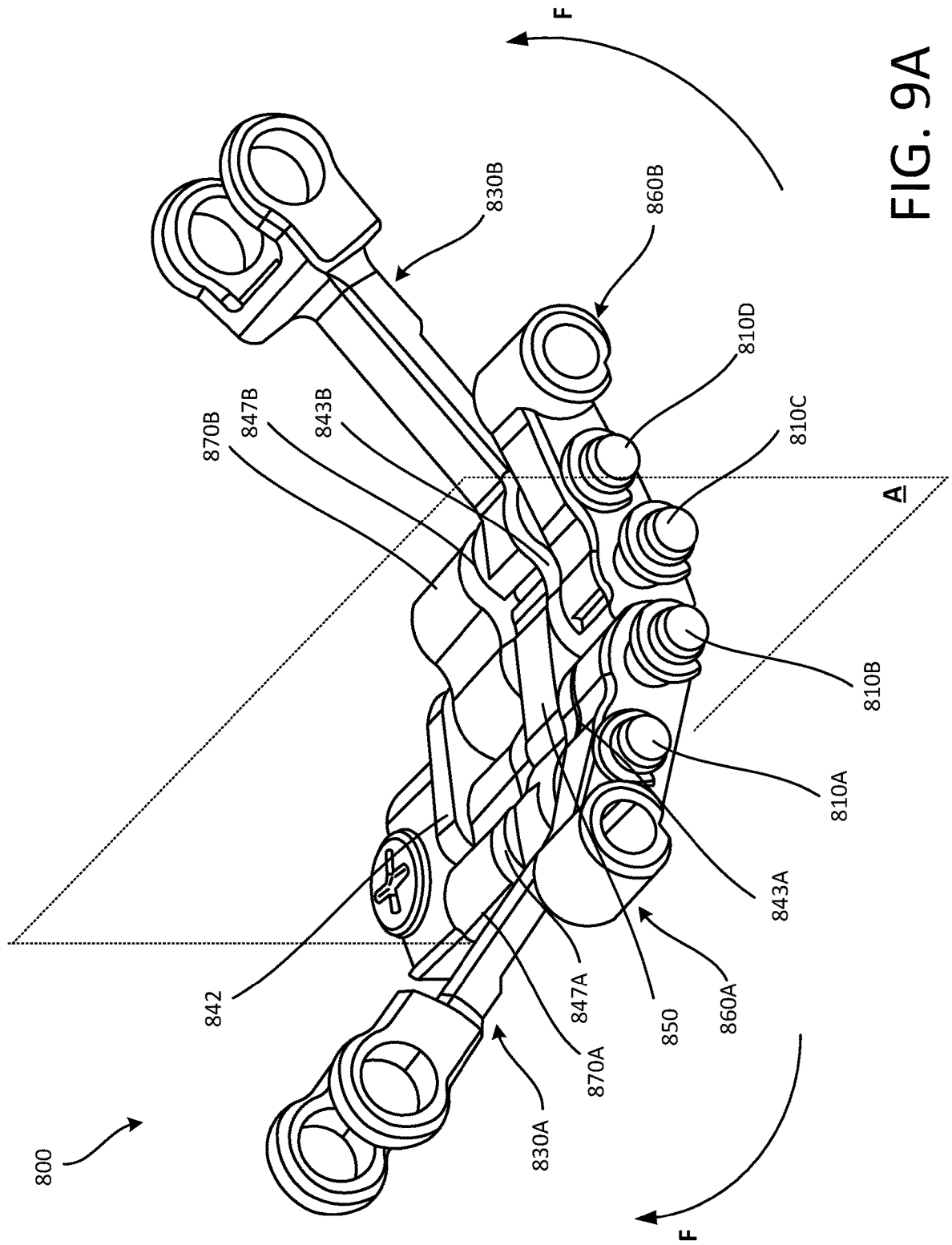
FIGS. 9A and 9B are assembled perspective views of the exemplary gear module shown in FIG. 8D, in accordance with implementations described herein.
Figure 9B:
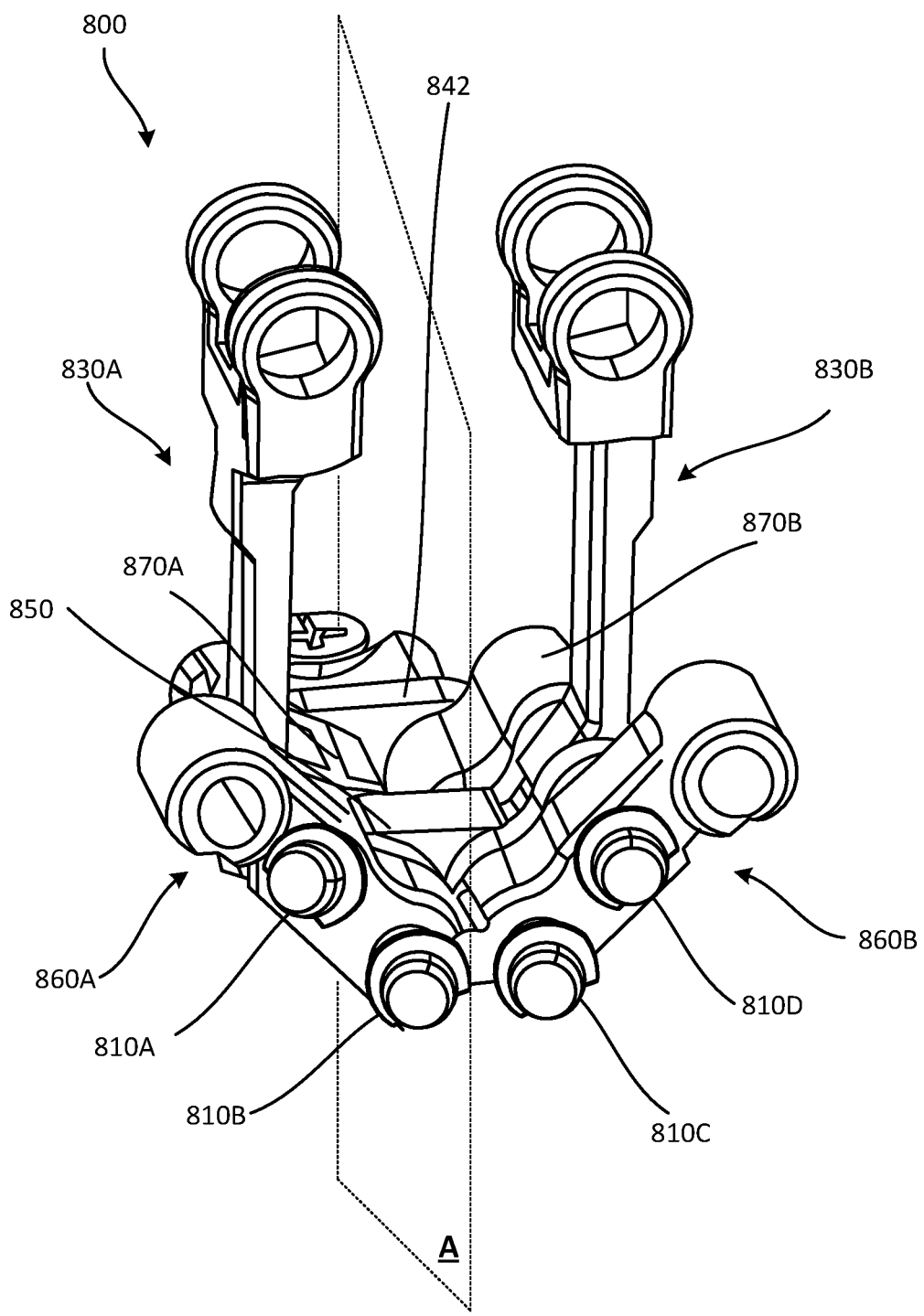

FIGS. 9A and 9B are assembled side perspective views of the hinge module 800 shown in FIG. 8D, in a partially folded and a fully folded configuration of the gear module 800, respectively. In response to a force applied in the direction of the arrow F, the components of the gear module 800 may move, from the partially folded configuration shown in FIG. 9A, to the substantially fully folded configuration shown in FIG. 9B. As noted above, the components of the gear module 800 may be arranged symmetrically with respect to the plane A, and may move symmetrically, or in a synchronized fashion, with respect to the plane A, due to the meshing of respective gears 864 of the first and second synchronizing members 860, the meshing of the gear 834 of the first link 830A with the gear 854A of the central synchronizing gear 850, and the meshing of the gear 834 of the second link 830B with the gear 854B of the central synchronizing gear 850. The arrangement of the components of the gear module 800, and in particular, the interaction of the links 830 and the synchronizing gears 850 (854A, 854B), and 860 (864A, 864B), joined by the pins 810, allow movement of the hinge mechanism 280 to remain connected to, or corresponding to, the virtual joints (determined as described above with respect to FIGS. 3-6C, and/or determined as described above with respect to FIGS. 7A-7D).

FIG. 10A is a cross-sectional view of the hinge mechanism 280 in the unfolded configuration. FIG. 10B is a cross-sectional view of the hinge mechanism 280 in a first intermediate configuration, such as, for example, a folded position of greater than approximately 90 degrees between the first housing 240A and the second housing 240B of the exemplary computing device 200 shown in FIGS. 2A and 2B). FIG. 10C is a cross-sectional view of the hinge mechanism 280 in a second intermediate configuration, such as, for example, a folded position of greater than approximately 90 degrees between the first and second housings of the exemplary computing device 200. FIG. 10B is a cross-sectional view of the hinge mechanism 280 in the substantially fully folded configuration.

As shown in FIGS. 10A-10D, a motion of the gear module 800 may be facilitated the pins 880 received in the opening 867 formed in the coupling portion 863 of the respective synchronizing member 860, and/or by the slide pins 885 received in the slots 837 formed at the coupling portion 836 of the respective link 830. This connection may provide for the substantially symmetrical movement of the components of the hinge mechanism 280 (i.e., the symmetrical movement of the components of the hinge mechanism 280 about the central plane A, which may also define a separation between the first housing 240A and the second housing 240B of the computing device 200). This connection may also smooth the motion of the gear module 800 between the unfolded configuration and the folded configuration.

In particular, in the unfolded configuration shown in FIG. 10A, each of the slide pins 885A, 885B is at a first position within a slot 910A, 910B of the respective slide/lock module 900A, 900B in which it is received. As the computing device 200 is folded, for example, from the unfolded configuration shown in FIG. 10A to the interim configurations shown in FIGS. 10B and 10C, and into the fully folded configuration shown in FIG. 10D, a position of the slide pins 885 within the slots 910, and relative to the position of the respective housing 240, changes. That is, as the housings 240A, 240B of the computing device 200 are moved as shown in FIGS. 10A-10D, the slide pins 885 move in the slots 910, thus providing for the change in length L (discussed above with respect to FIGS. 3A-5B).

Figure 10E:
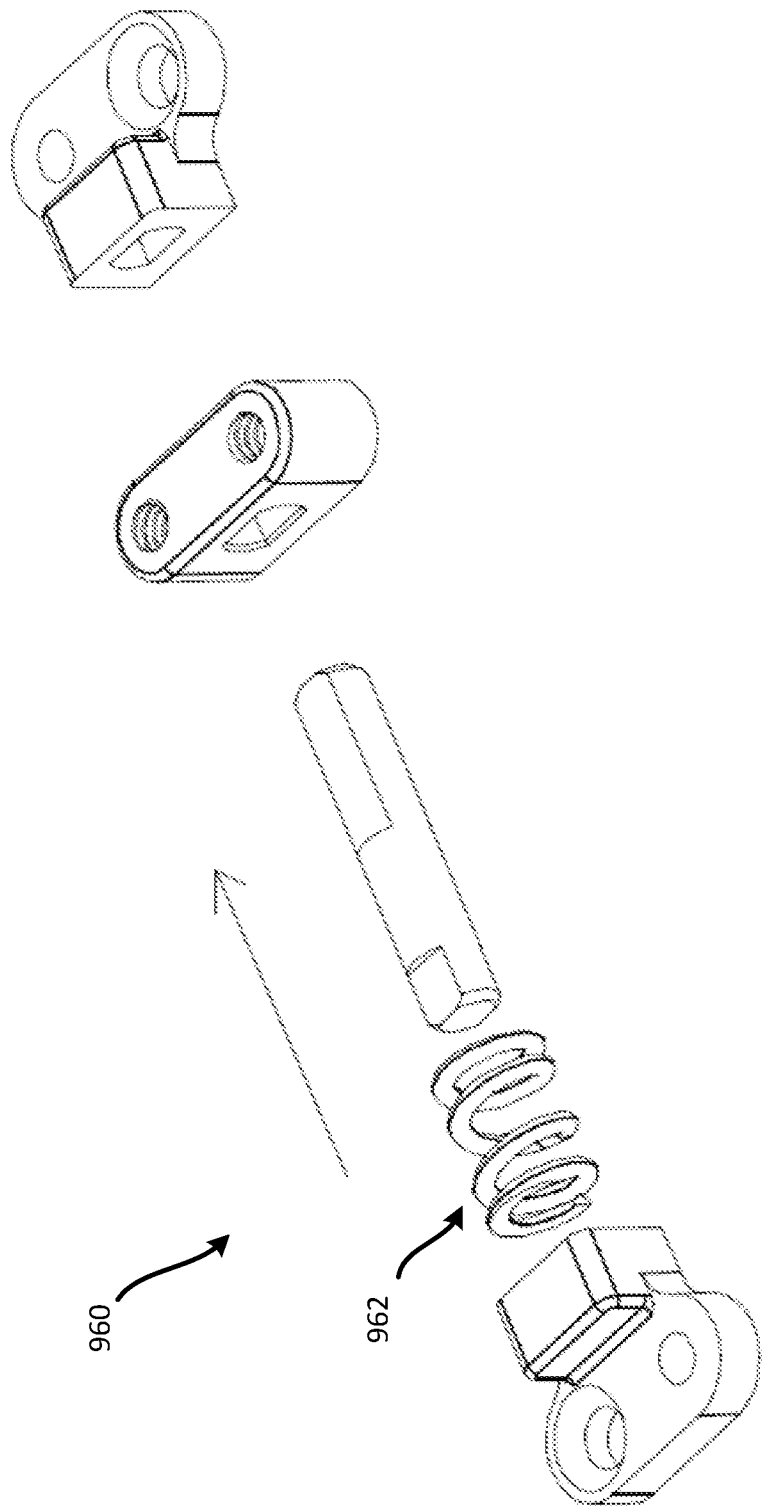
FIG. 10E is an exploded perspective view of an exemplary biasing device, in accordance with implementations described herein.

In some implementations, the slide/lock modules 900 (900A, 900B) may include a biasing device 960. An exploded perspective view of an exemplary biasing device 960 is shown in FIG. 10E. The biasing device 960 may be coupled between a base plate of the slide/lock module 900 and the gear module 800. The biasing device 960 may include a biasing member 962, or spring 962, that exerts a biasing force that urges the slide/lock module 900 outward (for example, with respect to the central plane A of the hinge mechanism 280).

Figure 11A:
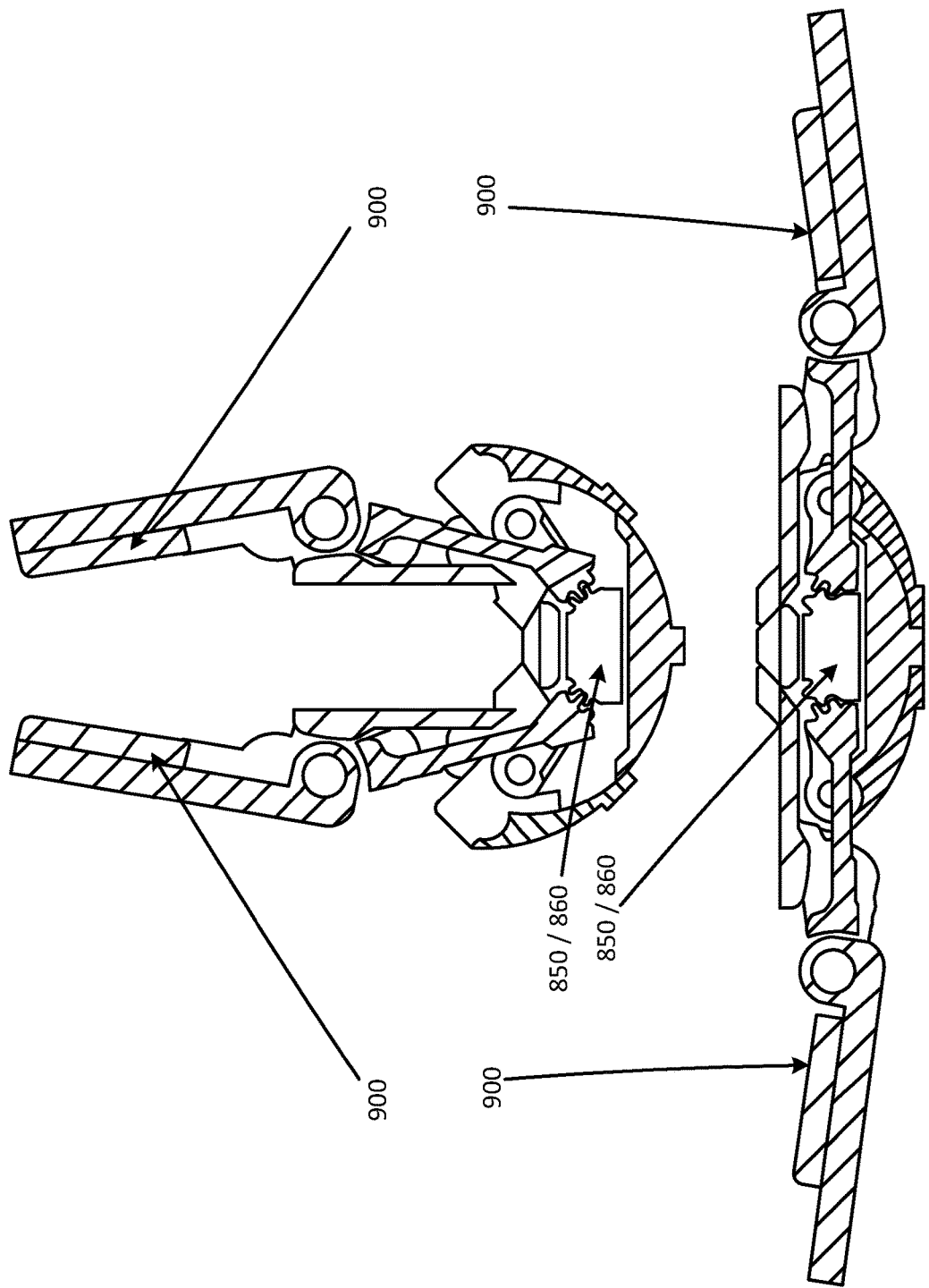
FIG. 11A is a schematic cross-sectional view of the exemplary hinge mechanism shown in FIGS. 8A-8D, taken along line D-D of FIG. 8B, illustrating movement of an exemplary slide-lock module of the exemplary hinge mechanism, in accordance with implementations described herein.

Thus, as shown in FIG. 11A, the synchronizing elements 850, 860 (including the gears 854, 864, 834 as described above) may provide for coordinated, symmetrical, synchronized motion of the hinge mechanism 280. Each of the links 830 may interact with a corresponding slide/lock module 900 to coordinate this relative motion with the respective portion of the housing 240 of the computing device 200, and to connect the relative motion to a locking mechanism provided by the slide/lock module 900.

Figure 11B:
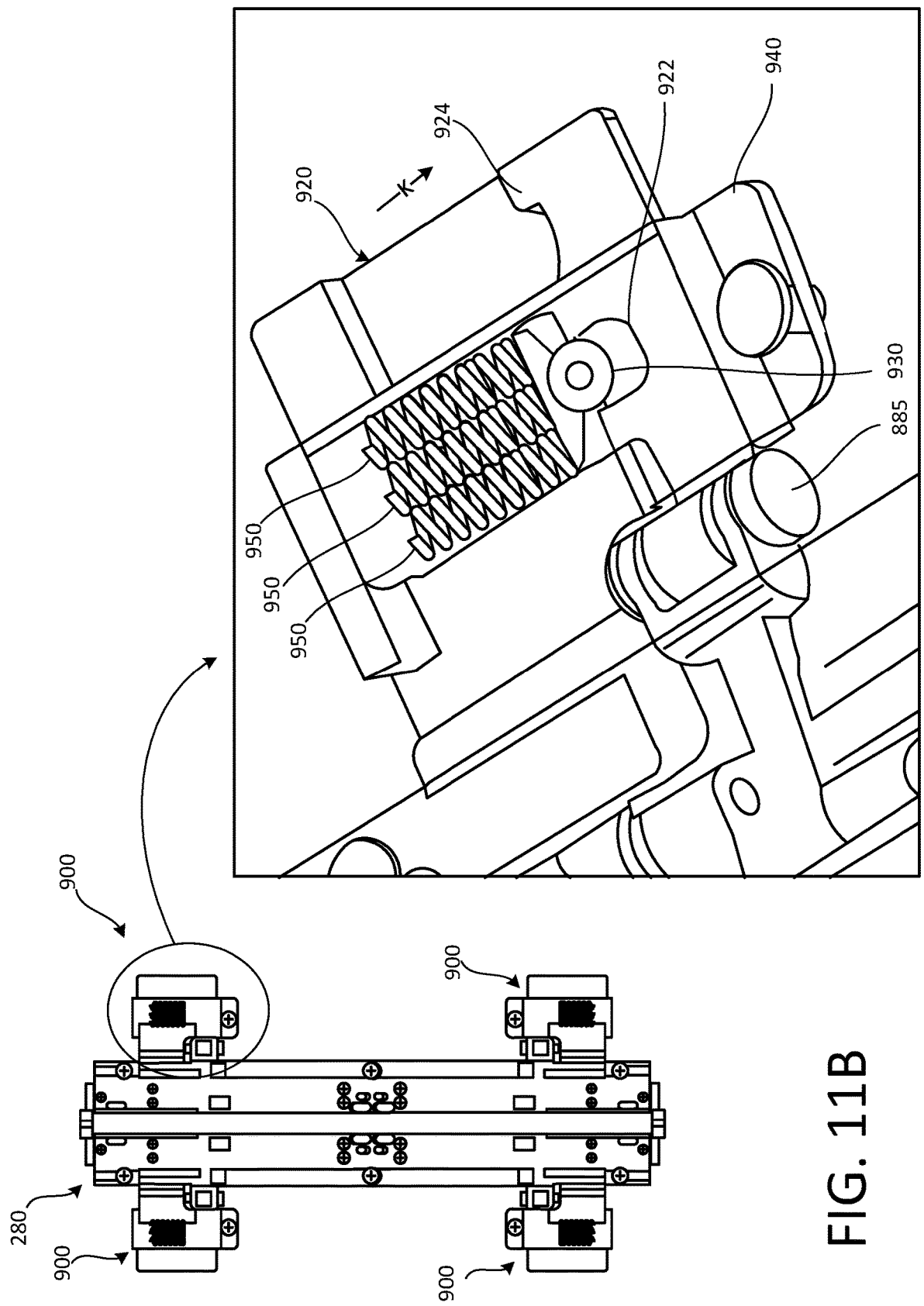
FIG. 11B is a perspective view of an exemplary slide-lock module of the exemplary hinge mechanism, and FIGS. 11C and 11D the exemplary slide-lock module in unfolded and folded configurations, respectively.

As shown in FIG. 11B, each slide/lock module 900 may include a first plate 920. A first detent 922, or first recess 922, and a second detent 924, or second recess 924, may be formed on the plate 920. The first recess 922 may fix a position of the computing device 200 in the unfolded configuration of the computing device 200, such that the computing device 200 is restricted from further movement, or bending, beyond a maximum bending radius (for example, beyond approximately 180 degrees). The second recess 924 may fix a position of the computing device 200 in the folded configuration of the computing device 200, such that the computing device is restricted from further movement, or bending, beyond a minimum bending radius. In some implementations, the plate 920 may include more, or fewer, recesses to fix the computing device 200 at various other positions.

Figure 11D:
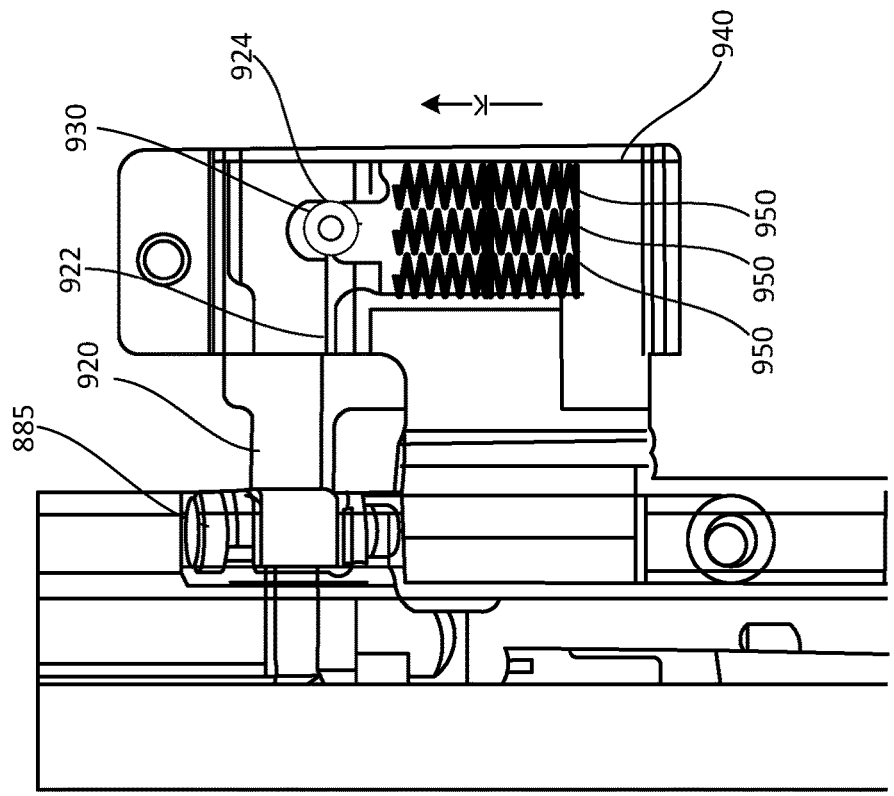
Figure 11C:
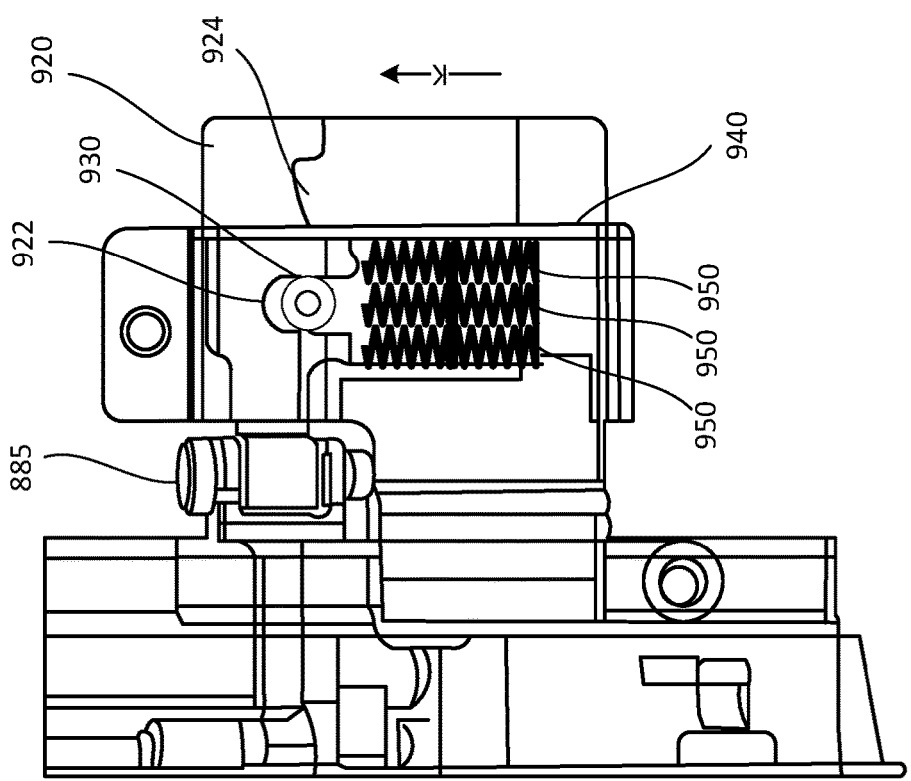

A cam wheel 930 may be coupled to a second plate 940. One or more biasing members 950, or springs 950, positioned between the first and second plates 920, 940 may exert a biasing force K on the cam wheel 930, that urges the cam wheel 930 into one of the recesses 922, 924, depending on a position and/or direction of movement of the housing 240 of the computing device 200. The biasing force of the spring(s) 950 may be overcome by a user force exerted on the housing 240, to unfold or fold the computing device 200, which would release the cam wheel 930 from the recess 922, 924 in which it is received. FIG. 11C illustrates the slide/ lock module 900 in the unfolded configuration. In this arrangement, the cam wheel 930 is received in the first recess 922, and the slide pin 885 is received at the first end portion of the slot 910 (see also, FIG. 10A). An externally applied force, in the folding or closing direction (for example, the force in the direction of the arrow F, as shown in FIG. 9A) overcomes the biasing force exerted on the cam wheel 930 by the spring(s) 950, releasing the cam wheel 930 from the first recess 922. The cam wheel 930 may be received in the second recess 924 as shown in FIG. 11D, with the slide pin 885 received at the second end portion of the slot 910 (see also, FIG. 10D) in response to the biasing force applied by the spring(s) 950 as the computing device 200 moves to the folded configuration.

Figures 12C, 12D:
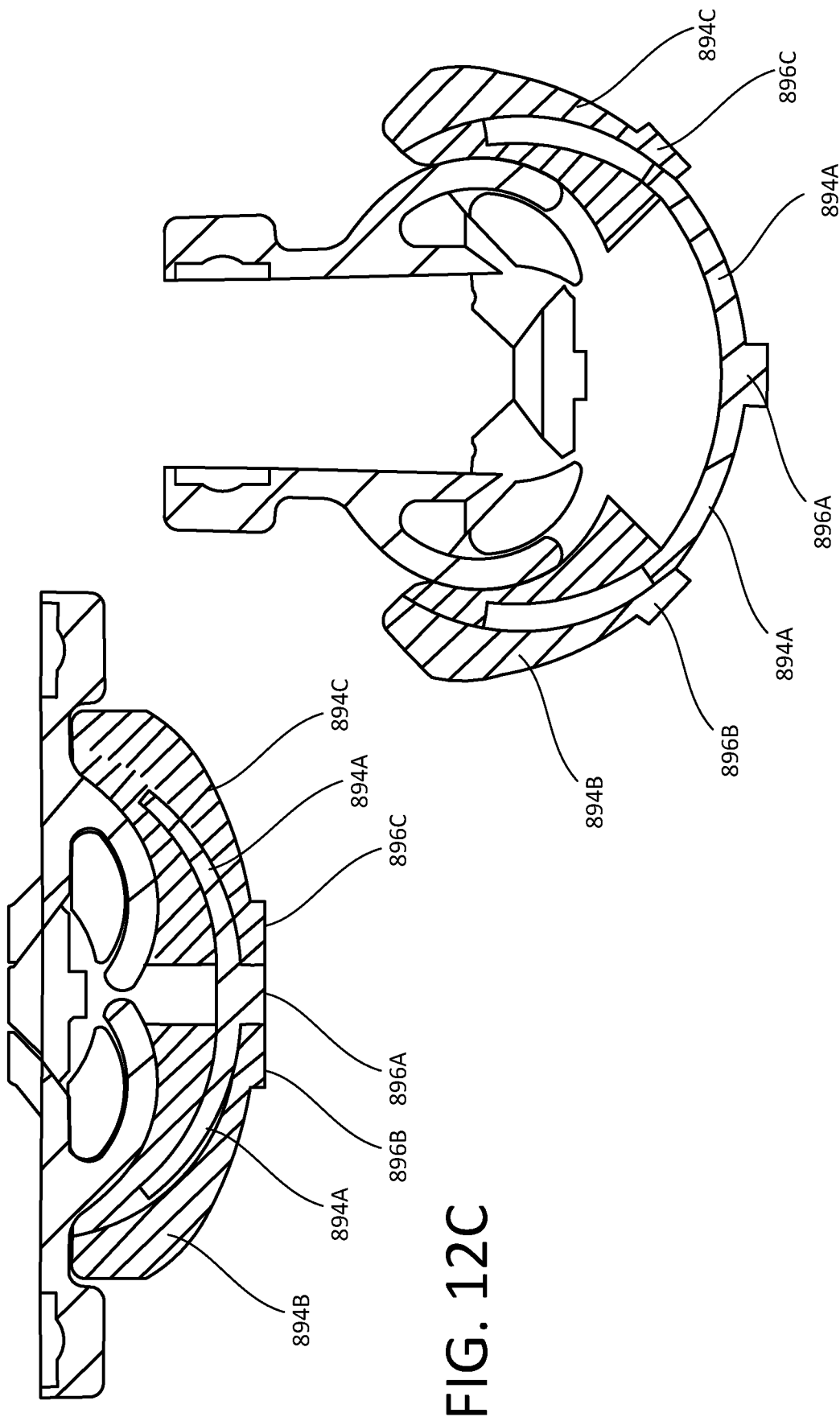
FIGS. 12C and 12D are cross sectional views taken along lines E-E and E'-E' of FIGS. 12A and 12B, respectively.

FIGS. 12A and 12B are perspective views of an exemplary outer cover module 890 of the exemplary hinge mechanism 280. FIGS. 12C and 12D are cross-sectional views of the exemplary outer cover module 890. In FIGS. 12A and 12C, the exemplary outer cover module 890 is shown in the unfolded configuration of the hinge mechanism 280/computing device 200. In FIGS. 12B and 12D, the exemplary outer cover module 890 is shown in the folded configuration of the hinge mechanism 280/computing device 200.

As shown in FIGS. 12A-12D, in some implementations, the outer cover module 890 may include a plurality of segments 892. In some implementations, a number of segments 892 may be determined based on, for example, an allowable bending radius of the computing device/foldable display, a number of associated virtual joints, a form factor of the computing device, and other such factors. In the exemplary arrangement shown in FIGS. 12A-12D, the exemplary cover module 890 includes three segments 892A, 892B and 892C, simply for purposes of discussion and illustration.

Each of the three exemplary segments 892 (892A, 892B, 892C) includes a wall portion 894 (894A, 894B, 894C) and a stopper portion 896 (896A, 896B, 896C). In the exemplary arrangement shown in FIGS. 12A-12D, the stopper portion 896A of the central segment 892 is positioned at a central portion of the wall portion 894A. In this exemplary arrangement, a radius of the central segment 892A may be less than the radius of the segment 892B and less than the segment 892C. Similarly, in this exemplary arrangement, a radius of the segments 892B and 892C may be substantially the same, or substantially equal. In this manner, the first segment 892A may be received in, or retracted into, or surrounded by, the second segment 892B and the third segment 892C in the unfolded configuration shown in FIGS. 12A and 12C, in a nested manner. In the folded configuration shown in FIGS. 12B and 12D, the first segment 892A may be extended out from between the second and third segments 892B, 892C, so as to maintain a continuous enclosure surrounding the internal components of the hinge mechanism 280. In the unfolded configuration shown in FIGS. 12A and 12C, the stopper portion 896B of the second segment 892B and the stopper portion 896C of the third segment 892C are positioned against, and stopped by, the stopper portion 896A of the first segment 892A, thus restricting further movement of the hinge mechanism 280 beyond the maximum bending radius (for example, beyond approximately 180 degrees). In the folded configuration shown in FIGS. 12B and 12D, a lip at each end portion of the wall portion 894A of the first segment 892A may engage a corresponding lip on the end portion of the respective stopper portion 896B, 896C, to restrict further movement of the hinge mechanism beyond the minimum bending radius. The outer cover module 890 including the segments 892 may provide a finished external appearance, and may prevent debris from entering the hinge mechanism 280. The arcuate contour of the segments 892 may follow concentric circles, corresponding to the axis of rotation of the corresponding joint.

In a computing device including a hinge mechanism, in accordance with implementations as described herein, a relatively simple, and relatively reliable hinge mechanism may support the folding and unfolding of a foldable display, with a relatively natural motion, while also providing for planarity of the foldable display in the unfolded configuration, particularly in the bendable section of the foldable display. This relatively simple and reliable hinge mechanism may guide and support the folding and unfolding of the computing device including the foldable display, while still providing support to the foldable display, and while still maintaining the foldable display within allowable bending radius limits.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It is understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It is understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A hinge mechanism, comprising:
an outer cover;
at least one gear module, including:
    a first link configured to be coupled to a first body, wherein the first link is configured to rotate about a first axis of rotation;
    a second link configured to be coupled to a second body, wherein the second link is configured to rotate about a third axis of rotation;
    a central synchronizing gear in meshed engagement between the first link and the second link, wherein the first link and the second link each include:
        a body;
        a gear at a first end portion of the body, in meshed engagement with the central synchronizing gear; and
        a coupling portion at a second end portion of the body, including at least one slot configured to slidably receive a slide pin, wherein the central synchronizing gear includes:
        a body;
        a first gear at a first end portion of the body, in meshed engagement with the first link; and
        a second gear at a second end portion of the body, in meshed engagement with the second link;
    a first synchronizing member coupled to the first link, wherein the first synchronizing member is configured to rotate about a second axis of rotation;
    a second synchronizing member coupled to the second link, wherein the second synchronizing member is in meshed engagement with the first synchronizing member, and wherein the second synchronizing member is configured to rotate about a fourth axis of rotation; and
at least one bracket coupling the at least one gear module to the outer cover; and
at least one lock module for selectively locking a position of the hinge mechanism, the at least one lock module coupled to the at least one gear module, wherein the first link and the second link, and the first synchronizing member and the second synchronizing member, are configured to rotate symmetrically about a central axis of the at least one gear module in response to an external force applied to the hinge mechanism,
wherein the slide pin is configured to couple the at least one lock module to the at least one gear module, the slide pin moveable within a slot of the lock module, wherein the at least one lock module comprises:
    a first plate and a second plate;
    a first recess and a second recess defined in the first plate;
    a cam coupled to the second plate, the cam configured to move along the first plate, between the first recess and the second recess due to relative movement between the first and second plates as the slide pin moves within the slot of the lock module, in response to an external force applied to the hinge mechanism; and
    a biasing member that selectively biases the cam toward the first recess or the second recess.

2. The hinge mechanism of claim 1, wherein the at least one gear module
further comprises a plurality of pins, including:
    a first pin that couples the first synchronizing member and a first torsion member of the at least one gear module;
    a second pin that couples the at least one bracket, the first synchronizing member, the central synchronizing gear, and the first torsion member;
    a third pin that couples the at least one bracket, the second synchronizing member, the central synchronizing gear, and a second torsion member of the at least one gear module; and
    a fourth pin that couples the second synchronizing member and the second torsion member.

3. The hinge mechanism of claim 2, wherein
the first pin is press fit into a first opening in the first torsion member, and the second pin is press fit into a second opening in the first torsion member, so as to generate frictional force therebetween; and
the third pin is press fit into a first opening in the second torsion member, and fourth pin is press fit into a second opening in the second torsion member, so as to generate frictional force therebetween.

4. The hinge mechanism of claim 1, wherein,
in an unfolded configuration of the hinge mechanism, the cam is biased into and held in the first recess so as to maintain the hinge mechanism in the unfolded configuration, and
in a folded configuration of the hinge mechanism, the cam is biased into and held in the second recess so as to maintain the hinge mechanism in the folded configuration.

5. The hinge mechanism of claim 4, wherein the outer cover is coupled to an exterior facing side of the at least one gear module and to the at least one lock module, wherein the outer cover comprises a plurality of segments, each of the plurality of segments including:
    a wall portion; and
    a stopper portion protruding from the wall portion,
    wherein, in the unfolded configuration of the hinge mechanism, the stopper portion abuts the stopper portion of an adjacent segment of the plurality of segments, so as to restrict further unfolding motion of the hinge mechanism, and in the folded configuration, a lip portion formed at a peripheral edge portion of the wall portion engages the lip portion of an adjacent segment of the plurality of segments, so as to restrict further folding motion of the hinge mechanism.

6. The hinge mechanism of claim 1, further comprising an inner cover, wherein the at least one gear module is received in a space formed between the inner cover and the outer cover, and the at least one lock module is coupled to an outer portion of the outer cover.

7. The hinge mechanism of claim 6, wherein
the at least one gear module comprises a plurality of gear modules, arranged within the space between the inner cover and the outer cover.

8. The hinge mechanism of claim 1, wherein the at least one lock module comprises a plurality of lock modules symmetrically coupled to a peripheral portion of the outer cover.

9. The hinge mechanism of claim 1, wherein a plurality of lock modules are coupled to the at least one gear module.

10. A foldable device comprising:
a first housing;
a second housing;
a foldable display coupled to the first housing and the second housing; and a hinge mechanism coupled to the first housing and the second housing, the hinge mechanism located at a position corresponding to a bendable section of the foldable display, wherein the hinge mechanism comprises:
an outer cover;
at least one gear module, including:
a first link configured to be coupled to the first housing, wherein the first link is configured to rotate about a first axis of rotation;
a second link configured to be coupled to the second housing, wherein the second link is configured to rotate about a third axis of rotation;
a central synchronizing gear in meshed engagement between the first link and the second link, wherein the first link and the second link each include:
a body;
a gear at a first end portion of the body, in meshed engagement with the central synchronizing gear; and
a coupling portion at a second end portion of the body, including at least one slot configured to slidably receive a slide pin, wherein the central synchronizing gear includes:
a body;
a first gear at a first end portion of the body, in meshed engagement with the first link; and
a second gear at a second end portion of the body, in meshed engagement with the second link;
a first synchronizing member coupled to the first link, wherein the first synchronizing member is configured to rotate about a second axis of rotation;
a second synchronizing member coupled to the second link, wherein the second synchronizing member is in meshed engagement with the first synchronizing member, and wherein the second synchronizing member is configured to rotate about a fourth axis of rotation; and
at least one bracket coupling the at least one gear module to the outer cover; and
at least one lock module for selectively locking a position of the hinge mechanism, the at least one lock module coupled to the at least one gear module
wherein the first link and the second link, and the first synchronizing member and the second synchronizing member, are configured to rotate symmetrically about a central axis of the at least one gear module in response to an external force applied to the hinge mechanism,
wherein the slide pin is configured to couple the at least one lock module to the at least one gear module, the slide pin moveable within a slot of the lock module, wherein the at least one lock module comprises:
a first plate and a second plate;
a first recess and a second recess defined in the first plate;
a cam coupled to the second plate, the cam configured to move along the first plate, between the first recess and the second recess due to relative movement between the first and second plates as the slide pin moves within the slot of the lock module, in response to an external force applied to the hinge mechanism; and
a biasing member that selectively biases the cam toward the first recess or the second recess.

11. The foldable device of claim 10, wherein the outer cover is coupled to an exterior facing side of the at least one gear module, between the first housing and the second housing.

12. The foldable device of claim 10, wherein the first link and the second link, and the first synchronizing member and the second synchronizing member, are configured to rotate symmetrically about a central axis of the gear module in response to an external force applied to the foldable device, so as to provide for synchronized movement of the first housing and the second housing.

* * * * *